US012806972B2

(12) United States Patent
Abadie et al.

(10) Patent No.: US 12,806,972 B2
(45) Date of Patent: Nov. 24, 2026

(54) VEHICLE GLAZING AND DEVICE HAVING AN ASSOCIATED NEAR-INFRARED DETECTION SYSTEM

(71) Applicant: SAINT-GOBAIN GLASS FRANCE, Courbevoie (FR)

(72) Inventors: Sacha Abadie, Paris (FR); Antoine Diguet, Paris (FR)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 427 days.

(21) Appl. No.: 18/551,125

(22) PCT Filed: Mar. 30, 2022

(86) PCT No.: PCT/FR2022/050599

§ 371 (c)(1),
(2) Date: Sep. 18, 2023

(87) PCT Pub. No.: WO2022/208025

PCT Pub. Date: Oct. 6, 2022

(65) Prior Publication Data

US 2024/0157768 A1 May 16, 2024

(30) Foreign Application Priority Data

Mar. 31, 2021 (FR) ....................................... 2103349

(51) Int. Cl.
*B60J 1/02* (2006.01)
*B32B 17/10* (2006.01)
(Continued)

(52) U.S. Cl.
CPC ....................................... *B60J 1/02* (2013.01); *C03C 4/10* (2013.01); *H05B 3/84* (2013.01); *H05B 2203/025* (2013.01)

(58) Field of Classification Search
None
See application file for complete search history.

(56) References Cited

U.S. PATENT DOCUMENTS

| | | |
|---|---|---|
| 5,162,046 A | 11/1992 | Mercado |
| 6,132,882 A | 10/2000 | Landin et al. |

(Continued)

FOREIGN PATENT DOCUMENTS

| | | | |
|---|---|---|---|
| CN | 102470802 A * | 5/2012 | G01S 7/4811 |
| CN | 102804912 A * | 11/2012 | H05B 3/84 |

(Continued)

OTHER PUBLICATIONS

Thirumoorthi et al., "Structure, optical and electrical properties of indium tin oxide ultrathin films prepared by jet nebulizer spray pyrolysis technique", Journal of Asian Ceramic Societies 4 (2016) 124-132. (Year: 2016).*

(Continued)

*Primary Examiner* — Hung Q Dang
(74) *Attorney, Agent, or Firm* — CUSHMAN PARTNERS LLC

(57) ABSTRACT

A vehicle glazed unit includes a first glass sheet forming an outer glazing that is extra-clear and a heating layer made of a transparent, near-infrared conductive oxide based on indium oxide with titanium or molybdenum.

20 Claims, 9 Drawing Sheets

(51) Int. Cl.

| | |
|---|---|
| ***C03C 4/10*** | (2006.01) |
| ***G01S 7/497*** | (2006.01) |
| ***G01S 17/931*** | (2020.01) |
| ***H05B 3/84*** | (2006.01) |

(56) References Cited

U.S. PATENT DOCUMENTS

| | | | | |
|---|---|---|---|---|
| 10,827,564 | B1 | 11/2020 | Wilson | |
| 2016/0205726 | A1* | 7/2016 | Spielmann | H05B 3/34 219/543 |
| 2020/0391698 | A1* | 12/2020 | Fukuda | G01S 7/4813 |

FOREIGN PATENT DOCUMENTS

| | | | | | |
|---|---|---|---|---|---|
| CN | 202986244 | U | * | 6/2013 | B32B 17/10651 |
| CN | 105981473 | A | * | 9/2016 | H05B 3/84 |
| CN | 111409314 | A | | 7/2020 | |
| CN | 111971173 | B | * | 4/2023 | |
| EP | 2796288 | A1 | * | 10/2014 | B32B 17/10036 |
| KR | 20060054336 | A | * | 5/2006 | H01Q 15/0013 |
| WO | WO 93/07329 | A1 | | 4/1993 | |
| WO | WO 2004/025334 | A2 | | 3/2004 | |
| WO | WO 2008/059170 | A2 | | 5/2008 | |
| WO | WO 2008/146693 | A1 | | 12/2008 | |
| WO | WO-2011015551 | A1 | * | 2/2011 | B60J 1/02 |
| WO | WO-2013131700 | A1 | * | 9/2013 | H05B 3/84 |
| WO | WO 2014/128016 | A1 | | 8/2014 | |
| WO | WO 2018/015312 | A1 | | 1/2018 | |
| WO | WO 2018/178278 | A1 | | 10/2018 | |
| WO | WO 2021/004685 | A1 | | 1/2021 | |
| WO | WO 2021/053138 | A1 | | 3/2021 | |

OTHER PUBLICATIONS

International Search Report as issued in International Patent Application No. PCT/FR2022/050599, dated Jul. 5, 2022.

Meng, Y., et al., "A new transparent conductive thin film $In_2O_3$:Mo," Thin Solid Films 394, 219 (Year: 2001).

Newhouse, P. F., et al., "High electron mobility W-doped $In_2O_3$ thin films by pulsed laser deposition," Appl. Phys. Lett. 87, 112108 (Year: 2005).

* cited by examiner

VEHICLE GLAZING AND DEVICE HAVING AN ASSOCIATED NEAR-INFRARED DETECTION SYSTEM

CROSS-REFERENCE TO RELATED APPLICATIONS

This application is the U.S. National Stage of PCT/FR2022/050599, filed Mar. 30, 2022, which in turn claims priority to French patent application number 2103349 filed Mar. 31, 2021. The content of these applications are incorporated herein by reference in their entireties.

The invention relates to a glazed unit, in particular a windshield, in a vehicle particularly a road vehicle or train, associated with a near-infrared detection system. The invention describes a device combining said glazed unit and the infrared detection system.

Autonomous vehicle glazed units and the associated technology are constantly evolving, particularly for improving safety.

Laser remote sensing or LIDAR (an acronym for "light detection and ranging" or "laser detection and ranging") can be used in the headlights of autonomous vehicles.

More recently, patent application WO20180153012 suggests placing a LIDAR operating in the near infrared between 750 nm and 1050 nm behind the laminated windshield comprising two sheets of extra clear glass and an infrared filter.

The performance of this vision device (glazed unit associated with the LIDAR) can be improved.

To this end, the present invention relates to a (curved) glazed unit of a vehicle, particularly of a road vehicle (car, truck, public transport: bus, coach, etc.) or railway vehicle (particularly with a maximum speed of at most 90 km/h or at most 70 km/h, in particular subway trains, trams), particularly curved, in particular a (laminated) windshield, or a (monolithic, potentially tempered or laminated) rear window, indeed even a (monolithic, potentially tempered or laminated) side glazed unit, or even a roof, of a given thickness E1, for example sub-centimeter-scale, particularly of at most 9 mm or 7 mm or 5 mm for a road vehicle windshield, the particularly laminated glazed unit comprising:

- a first glass sheet, particularly curved, intended to be the external glazing, with a first external main face F1 and a second internal main face F2 oriented towards the passenger compartment, if a motor vehicle, of a thickness preferably of at most 4 mm, and even of at most 3 mm or 2.5 mm,—in particular 2.1 mm, 1.9 mm, 1.8 mm, 1.6 mm and 1.4 mm, and preferably at least 0.7 mm or 1 mm, the second glass sheet being in particular based on soda-lime, preferably soda-lime-silica, or even aluminosilicate or borosilicate, the first glass sheet preferably having a total iron oxide content by weight (expressed as $Fe_2O_3$) of at most 0.05%
- preferably a lamination interlayer (single or multi-laminations), optionally neutral, clear, extra clear or tinted particularly grey or green, made of polymer material preferably thermoplastic and better still polyvinyl butyral (PVB preferably with plasticizers), preferably if a road vehicle with a thickness of at most 1.8 mm, preferably of at most 1.2 mm and even of at most 0.9 mm (and preferably of at least 0.3 mm and even of at least 0.6 mm), the lamination interlayer being optionally acoustic and/or optionally having a cross section decreasing in the shape of a wedge from top to bottom of the laminated glazed unit (in particular a windshield) for a head-up display (HUD), the lamination interlayer having a main face Fa oriented toward F2 and a main face Fb opposite Fa
- preferably a second glass sheet intended to be the interior glazing, preferably curved and in particular tinted (if with a through-hole), with a third main face F3 on the side of F2 and a fourth main internal face F4 oriented toward the passenger compartment, if a road vehicle with a thickness preferably less than that of the first glazing, even of at most 3 mm or 2 mm—particularly 1.9 mm, 1.8 mm, 1.6 mm and 1.4 mm—or even of at most 1.3 mm, and preferably of at least 0.7 mm, the thickness of the first and second glass sheets being preferably strictly less than 5 or 4 mm, even than 3.7 mm, the second glass sheet being in particular based on soda-lime, preferably soda-lime-silica, or even aluminosilicate or borosilicate.

At least one first zone, called infrared transmission zone, particularly centimetric, for example with a smaller dimension of at least 3 cm and a larger dimension of at most 70 cm, of said glazed unit according to the invention is transparent to a so-called working wavelength in the infrared in a range from 800 nm to 1800 nm, particularly 905 nm±30 nm and/or 1550 nm±30 nm (for Lidar) or even, in particular, from 800 nm to 1700 nm or 1200 nm (for near-infrared cameras). For example, the infrared transmission zone can be up to 30 cm high (and at least centimetric, and even at least 3 or 5 cm) and up to 70 cm or 50 cm long (and at least centimetric, and even at least 3 cm or 5 cm or 10 cm).

In said infrared transmission zone, the glazed unit according to the invention comprising, opposite the F1 face (that is, on the F2 face side), a heating coating comprising a heating layer made of a transparent electroconductive material (in other words, TCO for transparent conductive oxide) at said so-called working wavelength (thus forming an at least local heating zone), preferably supplied with at least two current leads, in particular flat connector(s) or two (local) busbars, in particular arranged on two opposite sides of the coating, preferably the two sides closest to the layer (for example, the height of the heating layer), preferably masked from the outside (by an opaque layer, possibly for camouflage).

The electrically conductive material according to the invention is a transparent conductive oxide comprising an indium oxide and (at least notably one) other metal selected from molybdenum and titanium, the other metal possibly in the oxidized state (in particular titanium oxide). Indium molybdenum oxide can be referred to as IMO and indium titanium oxide as ITiO.

In the infrared transmission zone with the heated coating, the glazed unit according to the invention has:

- an infrared transmission of at least 70% or 75%, 80% or 85% at the working wavelength, particularly 905±30 nm and/or 1550±30 nm (for a LIDAR), in particular measured at an angle of incidence of 0° (in other words at 90° relative to the local plane of the glazed unit) or even preferably with a total transmission of at least 70% or 75% or 80% measured at an angle of incidence of 60°.

and even with a haze of no more than 2% or 1%.

The heating layer protects this transmission zone from frost and/or fog.

In the case of vehicle glazed units, in particular windshields, it is known to use a stack of silver layers within the laminated glass covering the entire glazed unit as a transparent heating layer in the visible.

In addition, as a low-emissivity layer, especially in vehicle roofs on the free side of the passenger compartment, a stack with indium tin oxide (ITO) is sometimes used.

However, stacking with silver or even ITO does not sufficiently transmit near-infrared.

IMO and ITiO according to the invention are particularly transparent materials and sufficiently conductive for the heating function.

The heating layer (and even the heating coating) can be solid or have one or more discontinuities, for example line(s) (of submillimeter width), in particular the heating zone can be made up of several sub-zones (each one with two busbars on two opposite sides of the layer, in particular the two closest sides).

In one configuration, the heating layer (and even the heating coating) is local and does not protrude significantly beyond the infrared transmission zone at least at the working wavelength. The heating layer preferably protrudes by at least 5 mm and for example by at most 50 mm or 20 mm from the infrared transmission zone so that the two busbars are offset from the infrared transmission zone (for example, busbars underneath face F3, offset by one through-hole, on either side of the through-hole).

The glazed unit may comprise another local heating layer disjoined from the (selected local) heating layer in the same or similar material and/or thickness and/or surface.

The heating layer may also extend to cover another infrared or other transmission zone adjacent to said infrared transmission zone.

The invention is particularly suitable for glazed units (windshield, window, etc.) for autonomous or semi-autonomous vehicles: levels L2+, L3, L4 and L5 ("fully" autonomous) as well as vehicles such as Robot Taxis and shuttles, etc.

The angle of the glazed unit, particularly a windshield of a road vehicle, can typically be between 21° and 36° relative to the ground and on average 30°.

The invention is suitable for forming a short-wave infrared (SWIR) transmission zone for a LIDAR or a SWIR camera.

The heating coating is notably on a substrate (in particular glass and preferably extra-clear) chosen from:

- the first sheet of glass, on face F2 (bare or coated with a functional coating), the glazed unit being monolithic in particular side window or rear window.
- or the glazed unit being laminated and comprising, on the face F2, a lamination interlayer and a second glass sheet:
- (first configuration of laminated glazed unit) the second glass sheet, preferably on a main face F3 of the second glass sheet facing face F2, a second glass sheet transparent to the working wavelength, in particular made of extra-clear glass
- (second configuration of laminated glazed unit) a piece transparent to the working wavelength, on a main face of the piece preferably facing face F2, which is in (and even partly under) a through-hole of the second glass sheet, in particular tinted, in the infrared transmission zone in particular piece on the lamination interlayer (projecting or not under the through-hole of the second sheet) or glued on the face F2 (bare or coated with a functional coating), the lamination interlayer being perforated by an interlayer through-hole in line with said through-hole.
- the first glass sheet, on the face F2 (bare or coated with a functional coating), the lamination interlayer being possibly perforated by an interlayer through-hole at right angles to a through-hole of the second glass sheet (in the infrared transmission zone), (so-called third configuration of the laminated glazed unit).
- a film (polymer or mineral or hybrid), particularly submillimeter, within the lamination interlayer, transparent to the working wavelength, this film possibly extending all or some of the infrared transmission zone (extending beyond a through-hole in the second glass sheet, in particular tinted, in particular with a piece in the through-hole), (known as the fourth configuration of the laminated glazed unit). The film (carrying the heating coating) can be made of glass, in particular extra-clear and/or tempered glass (after the deposition of the heating layer—preferably said heating coating), in particular with a thickness of at most 0.3 mm or 0.2 mm.

The film can therefore be an ultrathin glass (UTG).

The polymer film can be made of polyamide, polyester, polyolefin (PE: polyethylene, PP: polypropylene), polystyrene, polyvinyl chloride (PVC), polyethylene terephthalate (PET), polymethyl methacrylate (PMMA) or polycarbonate (PC). A PET film is preferred. The polymer film can be between 10 and 100 or 200 μm thick. The film is particularly flexible (UTG etc.) and can be adapted to the curvature of the glass (curved).

In the second configuration of laminated glazed unit, this piece according to the invention is added in the through-hole to improve safety. Thus in this configuration according to the invention, the following is selected in order to reach a high level of transmission for the laminated glazed unit:

1) an exterior glass that is extra clear in the targeted near-infrared region,
2) an interior glass that is more absorbent in the targeted near-infrared region than the exterior glass and necessarily hollowed out.

This solution avoids the use of a second extra clear-glass sheet, it improves the comfort (heat inside the vehicle), aesthetics and is less expensive.

In particular, the through-hole opens out onto said upper longitudinal edge or edge face or is closed off (surrounded by the glass wall of the second sheet), particularly in the vicinity of the upper longitudinal edge face.

The piece can be a glass, especially extra-clear and/or tempered glass, in particular the heating layer (and even the heating coating) is also tempered or annealed.

In one configuration, the heating layer (and even the heating coating) is local but extends sufficiently to cover a visible transmission zone adjacent to (next to) the infrared transmission zone, for example, of one or more detectors, sensors: Visible-spectrum camera, humidity sensors, rain sensor, light sensor (photodiode), antenna sensor for receiving and/or transmitting electromagnetic waves (radio, TV especially local communication network such as BLUETOOTH, WIFI, WLAN), an acoustic sensor (based on a piezoelectric element), an ultrasonic signal detector, a diagnostic sensor, a control detector (windshield wiper, etc). In particular, the substrate which is a film (UTG etc.) exceeding all or part of the infrared transmission zone can carry sensor(s), detector, antenna(s.

The total infrared transmission is measured for example with a spectrophotometer such as the Lamda 900 from Perkin Elmer.

One may want to reduce the thickness as much as possible to avoid penalizing transparency (not absorbing too much) and even to avoid overthicknesses (and an unnecessary excess cost).

The thickness of the heating layer and even of the heating coating is preferably at most 300 m and preferably at most 150 nm. Preferably the thickness of the heating layer is at least 2 or 5 nm.

One may want to reduce the resistivity of the heating layer to avoid having to apply a high voltage.

The resistivity of the heating layer is preferably at most 500 or 450 μohm·cm or 300 μohm·cm or even at most 250 μohm·cm.

Furthermore, the resistance per square of the heating coating can be up to 500, 300 or 100 ohm/square or even up to 50 or 30 ohm/square.

The voltage applied to the heating layer (to the heating coating), via at least two busbars on two opposite sides in particular, can be up to 400V, in particular from 100V to 400V for electric vehicles (in particular 110V and 220V).

The voltage can be no more than 80V, in particular 12V, 24V, 15V or 48V.

The heating layer (heating system) can be defined by a power density of at least 100, 200 or 300 $W/m^2$ and at most 2000 $W/m^2$ or 1000 $W/m^2$, preferably 200 to 700 $W/m^2$ (this also depends on the desired speed for defogging or defrosting), in particular with an applied voltage of at most 400V and even at most 120V or 50V.

The heating coating, and even the infrared transmission zone in particular, can be free of metallic absorbing and/or reflecting layers for the near-infrared at the working wavelength (or at least with a thickness of at most 10 nm or 5 nm or 3 nm).

Preferably, for the heating layer:

- the weight percentage of indium oxide is at least 90% of the total weight (of the heating layer) and preferably at least 92% or 95% and preferably at most 98%,
- the weight percentage of molybdenum and/or molybdenum oxide, titanium and/or titanium oxide is preferably at least 2% and preferably at most 10% or 5% or 4% or 3%.

In particular, the sum by weight of indium and titanium (especially oxidized) and/or molybdenum (oxidized and/or metallic) is at least 99% or 100% by weight in total (of the heating layer).

The heating coating may comprise a stack of layers as follows: an underlayer of oxy and/or metal or silicon nitride underlying the heating layer, and/or an overlayer of oxy and/or metal or silicon nitride on the heating layer.

Indeed a neutralizing undercoat, or undercoats, can be applied. In the case of a single layer, its refractive index is preferably between the refractive index of the substrate (for example, glass) carrying the heating coating and the refractive index of said heating layer. Such layers or stacks of layers make it possible to influence the reflective appearance of the glazed unit, particularly the reflective color thereof. As non-limiting examples, it is possible to use a layer of mixed oxide of silicon and tin ($SiSnO_x$), of silicon oxycarbide or silicon oxynitride, of aluminum oxide, or of mixed oxide of titanium and silicon.

One possible layer stack includes two high and low index layers, for example a $TiO_2/SiO_2$, $Si_3N_4/SiO_2$ stack. The geometric thickness of said layer(s) is preferably within a range from 15 nm to 70 nm. Preferably, a neutralization layer of a silicon oxynitride or a $Si_3N_4/SiO_2$ stack is arranged under this layer.

In particular, it is preferable to have an adhesion layer between the substrate and the heating layer or neutralization stack. This layer, which advantageously has a refractive index close to that of the chosen glass substrate (for example, UTG film or glass part), improves the resistance to tempering by promoting the adhesion of the neutralization layer. The adhesion layer is preferably made of silica. Its geometric thickness is preferably within a range extending from 20 to 200 nm, particularly from 30 to 150 nm.

The various preferred embodiments described above can of course be combined with each other. Not all possible combinations are of course explicitly described in this text. Some examples of particularly preferred stacks for the heating coating are given below for a particular glass substrate (UTG or even piece or even first or second glass sheet):

SiOC/heating layer/$SiO_2$(/$TiO_2$)
$SiSnO_x$/heating layer/$SiO_2$(/$TiO_2$)
($SiO_2$)/$SiO_xN_y$/heating layer/$Si_3N_4/SiO_2/TiO_2$
$SiO_2/Si_3N_4/SiO_2$/heating layer/$Si_3N_4/SiO_2/TiO_2$
$Si_3N_4/SiO_2$/heating layer/$Si_3N_4/SiO_2/TiO_2$.

According to one embodiment, the heating layer is obtained by liquid deposition or by chemical deposition.

According to a preferred embodiment, the layers of the heating coating are obtained by cathode sputtering, in particular assisted by a magnetic field (magnetron process), reactive or not (neutral gas and/or oxygen).

The major advantage of this method lies in the possibility of depositing a very complex multilayer on one and the same line by making the substrate run in succession beneath various targets, generally in one and the same device.

It is easier in the case of magnetron deposition to make the (local) heating layer on a film (UTG etc) than on face F2 or F3.

For example, for IMO we choose a target of indium oxide (98% by weight) and molybdenum (2% by weight); the gas can be neutral like argon, oxygen or an argon-oxygen mixture (predominantly argon for example). The substrate can be heated or not during the deposition For example, for ITiO we choose a target of indium oxide (98% by weight) and titanium oxide (2% by weight); the gas can be neutral like argon, oxygen or an argon-oxygen mixture (predominantly argon for example). The substrate can be heated or not during the deposition.

Traces of argon may be present in the heating layer.

To increase the electrical conductivity, a heat treatment after the deposition is possible. This heat treatment is preferably chosen among the treatments of tempering, annealing, fast annealing.

The tempering or annealing treatment is generally carried out in a furnace, respectively a tempering or annealing furnace. All of the mineral substrate chosen, preferably for glass, is brought to a high temperature, of at least 300° C. in the case of annealing (in particular for at least 30 min), and of at least 500° C., or even 600° C., in the case of tempering (notably bending/toughening).

The rapid annealing is preferably carried out using a flame, a plasma torch or laser radiation. In this type of method, a relative movement is created between the substrate and the device (flame, laser, plasma torch). Generally, the device is mobile, and the substrate coated with the heating coating runs past facing the device in such a way as to treat its surface. These methods make it possible to deliver a high energy density to the coating to be treated in a very short space of time, thus limiting the diffusion of heat toward the substrate, and thus the heating of said substrate. The temperature of the substrate is generally at most 100° C., or even 50° and even 30° C. during the treatment. Each point of the thin layer is subjected to the rapid annealing treatment for a period of generally less than or equal to 1 second, or even 0.5 seconds.

The heating layer can have at least two (local) busbars preferably on two opposite sides of the heating layer (and even the closest sides, especially horizontal busbars) hidden from the outside, particularly by:

- a masking layer opaque in the visible spectrum and at the working wavelength, offset from the infrared transmission zone at least by a central region, (the busbars also being offset from the central infrared transmission zone)
- and/or by a selective camouflage filter, opaque in the visible spectrum and transparent to the working wavelength, preferably in the infrared transmission zone and possibly protruding from said infrared transmission zone, in particular a camouflaging coating on face F2, more towards the outside than the busbars, the two busbars preferably being offset from the infrared transmission zone at least in the central zone region.

One may choose to place the two busbars on the nearest sides, particularly the horizontal busbars. Vertical or oblique lateral busbars parallel relative to the small sides (of the infrared transmission zone, of a through-hole, etc.) may nonetheless be preferred since horizontal busbars can generate local overthicknesses that promote distortions.

The heating layer can have at least two bus bars (local), preferably on two opposite sides of the heating layer, offset from the infrared transmission zone, particularly when the glazed unit is laminated and comprising, on face F2, a lamination interlayer and a second glass sheet which may be perforated in the infrared transmission zone, the (local) busbars are under the second glass sheet, in particular offset from the through-hole.

The busbars (local) are in the form of particularly rectangular strips which are (at least in part) outside the zone of the through-hole.

The width of the busbars (local) is preferably from 2 mm to 30 mm, in a particularly preferred way from 4 mm to 20 mm and in particular from 10 mm to 20 mm.

A busbar (local) particularly in a layer (printed) preferably contains at least one metal, a metal alloy, a metal and/or carbon compound, in particular preferably a noble metal and, in particular, silver. For example, the printing paste preferably contains metal particles, metal and/or carbon particles and, in particular, noble metal particles such as silver particles. The thickness of a layer busbar (printed) can preferably be from 5 μm to 40 μm, in a particularly preferred way from 8 μm to 20 μm and more particularly preferably from 8 μm to 1 μm.

Alternatively, however, it is possible to use for one or each busbar (local) an electrically conductive sheet, particularly a strip, for example rectangular. The busbar then contains, for example, at least aluminum, copper, tinned copper, gold, silver, zinc, tungsten and/or tin or alloys thereof. This sheet busbar (strip) preferably has a thickness of 10 μm to 500 μm, in a particularly preferred way of 30 μm to 300 μm.

It is possible in particular to have:

- an optional main heating zone with at least two electrical leads typically in the peripheral zone of the glazed unit (on the same edge, on two opposite edges or even two adjacent edges of the glazed unit), for example by an electrically conductive heating coating (holes in line with the through-hole)
- the local heating zone with at least two electrical leads or local busbars ("omnibus" bar, first and second busbars preferably masked from the outside as mentioned above.

The first busbar is preferably (substantially) horizontal and closest to the upper longitudinal edge of the glazed unit and the second busbar is then preferably (substantially) horizontal, first and second bus bar on either side of the through-hole if any, for example.

The length of the busbars are adapted as needed.

The supply of power of the (first, second) busbars can be provided wirelessly and/or with a connector (wires, flat connectors, etc.).

In the infrared transmission zone with the heating coating, the glazed unit can have on face F2 (the face opposite F1) a selective camouflage filter, absorbing in the visible and transparent to the working wavelength, the glazed unit then having a total transmission of at most 10.0%, 5.0%, or 1.0% or 0.5% in the visible spectrum, in particular at least at a reference value in a range of 400 nm to 700 nm.

The selective filter is, for example, a camouflaging coating on face F2 or, the glazed unit being laminated and comprising, on the face F2 side, a lamination interlayer and a second sheet of glass with a main face F3 facing face F2 and a face F4 facing the passenger compartment, the camouflaging coating on a submillimeter film within the lamination interlayer, and even the selective filter on face F2 or on the film protruding under face F3. The heating coating is particularly distant from face F2, possibly on said submillimeter film within the laminate interlayer with possibly the camouflaging coating.

In particular, the selective filter is a camouflaging coating on face F2 or on a film (particularly UTG, polymer) under face F3 within the lamination interlayer preferably protruding from the infrared transmission zone and the heating coating is preferably distant from face F2 possibly on a submillimeter film within the lamination interlayer with possibly the camouflaging coating.

The camouflaging coating can be on the same main face as the heating coating for example underlying to promote electrical contact at the busbars.

The camouflaging coating can be on a main face opposite the heating coating in particular the camouflaging coating oriented on the face F2 side and the heating coating oriented on the face F3 side.

In one embodiment, the selective filter particularly a camouflaging coating comprises a matrix (organic, polymeric, mineral or hybrid) and a coloring agent dispersed in said matrix, said coloring agent absorbing (substantially all) the light located in said visible range and being (substantially) transparent to said working wavelength, which camouflaging coating forms in the infrared transmission zone the camouflaging coating already described:

- on face F2
- or on the lamination interlayer, on the face FA or FB side, preferably made of PVB, in particular ink further comprising PVB particles
- or on a polymer film (which is transparent in the visible range and at the working wavelength), particularly PET in adhesive contact or bonded to F2 or in adhesive contact or bonded to the part, of a thickness of at most 0.3 mm, preferably connected to face F2.

The camouflaging coating may be of submillimeter thickness and even of at most 20 μm.

The camouflaging coating may be polymeric or an organic-mineral hybrid. The polymer matrix of the coloring layer is selected particularly from monomers, oligomers, or polymers comprising at least one methacrylate function, epoxides, varnishes consisting of dispersed particles of PVB, latex, polyurethane or acrylate.

The camouflaging coating may contain any pigment or dye having a higher transmittance in the infrared than its transmittance in the visible range, such as a near-infrared black ink which substantially absorbs visible wavelengths and transmits those in the near-infrared. For example, the camouflaging coating may contain dyes or inks such as Spectre™ inks, for example Spectre™ 100, 110, 120, 130, 140, 150, or 160 (Epolin, Newark, NJ); Mimaki inks, for example Mimaki ES3, SS21, BS3, SS2, or HS (Mimaki Global, Tomi-city, Nagano, Japan); or Seiko inks, for example Seiko 1000, 1300, SG700, SG740, or VIC (Seiko Advance Ltd., Japan) or else IR9508 black ink from MingBo anti Forgery Technology Co ltd.

The camouflaging coating may contain one or more components of black, cyan, magenta or yellow dye The camouflaging coating may include dyes or pigments or both. The coloring layer can include Lumogen® Black FK 4280 or Lumogen® Black FK 4281 (BASF, Southfield, MI).

Preferably in the camouflaging coating:

- the dye is selected from Sudan Black B® or Nigrosine Solvent black 5, and is preferably Sudan Black B®
- the dye represents between 0.1 and 10% by weight of the layer, preferably between 0.2 and 3% by weight of the layer.

The camouflaging coating may be a varnish of less than 30 μm.

For the camouflaging coating, it is possible to adjust the layer thickness or the percentage by weight of dye, in particular to less than 1%, 5% to 20%, 30%.

The selective filter may be a colored (bulk opaque) polymer film (within the lamination) or with a camouflaging coating adhesively bonded to or in adhesive contact with face F2.

The selective filter may comprise a colored (bulk opaque) polymer film such as PET, loaded in the bulk thereof with dyes by a "deep dyeing" roll-to-roll process, particularly by submerging in a hot bath with the dyes. The final concentration of dye must be sufficient to provide opaqueness in the visible range. Reference may be made to patent WO9307329 or U.S. Pat. No. 5,162,046.

It is possible, on a (transparent or colored) polymer film such as PET, to place a coloring layer by main face.

It is possible to combine a polymer film such as PET, bulk dyed, and a coloring layer on this film, another polymer film such as PET, on the remaining PET facing said through-hole or on face F2.

It is possible to provide different extents for the selective filter, in particular a camouflaging coating, under face F3 and particularly spaced apart from the piece:

- the selective filter extends under face F3 beyond the infrared transmission window (of said through-hole), from the outside extends a masking layer or masks a gap of a peripheral masking layer,
- the selective filter extends under face F3 beyond the infrared transmission window (of said through-hole), particularly from the outside extends a masking layer or masks a gap of a peripheral masking layer, the selective filter has at least one opening or local discontinuity for allowing the passage of light rays, particularly for at least one additional sensor in particular a sensor of a visible camera or thermal camera, in particular a camera attached to a holed plate in face F4 for allowing said light or electromagnetic rays (thermal camera) to pass.

The selective filter, particularly a camouflaging coating, can extend beyond the infrared transmission zone, for example by no more than 50 mm or better still by no more than 20 mm between face F2 and face F3.

The selective filter, particularly a camouflaging coating, can be defined by a L*1, a*1 b*1, defined in the L*a*b* CIE 1976 color space. The masking layer of color C1 is also defined by a L*2, a*2 b*2 with a color difference ΔE* given by the following formula:

$$\Delta E^* = \sqrt{(\Delta L^{*2} + \Delta a^{*2} + \Delta b^{*2})}.$$

Preferably, $\Delta E^* < 4$, better still $\Delta E^* < 2$ (discerned with difficulty by the human eye), even better still $\Delta E^* < 1$ (not discerned by the human eye).

In one embodiment, the glazed unit comprises, particularly on face F2 or, the glazed unit being laminated and comprising on the face F2 side a lamination interlayer and a second glass sheet with a main face F3 oriented towards face F2 and a face F4 oriented towards the passenger compartment, the functional layer is on F3 or F4. The functional layer extending over all or part of the glazed unit, in particular a transparent, optionally heatable, electrically conductive layer, in particular a silver, in particular monosilver and/or P-polarized light-reflecting stack, or an opaque masking layer, particularly an enamel functional layer which absorbs at said working wavelength and which is absent from the infrared transmission zone (in particular from said through-hole) at least in the central zone (in particular of said through-hole) and is present at the edge of the infrared transmission zone (in particular of the through-hole between faces F2 and Fa).

And optionally a functional coating is on face F2, transparent to the working wavelength, faces the infrared transmission zone (particularly the through-hole if any) being in contact with said functional layer, which is on face F2, particularly on or under the functional layer, particularly the functional layer is said heating coating or a camouflaging coating.

The transparent electrically conductive functional layer (solar control and/or heating) can comprise a stack of thin layers comprising at least one metal functional layer such as silver (on F2 or preferably F3 or on a polymer film). The or each functional (silver) layer is arranged between dielectric layers.

The functional layers preferably contain at least one metal, for example, silver, gold, copper, nickel and chromium or, or a metal alloy. The functional layers in particular preferably contain at least 90% by weight of metal, in particular at least 99.9% by weight of metal. The functional layers can be made of metal for the metal alloy. The functional layers contain in a particularly preferred manner silver or an alloy containing silver. The thickness of a functional layer (silver, etc.) is preferably from 5 nm to 50 nm, more preferentially from 8 nm to 25 nm. A dielectric layer contains at least one individual layer made of a dielectric material, for example, containing a nitride such as silicon nitride or an oxide such as aluminum oxide. The dielectric layer can however also contain a plurality of individual layers, for example, individual layers of a dielectric material, layers, smoothing layers, which corresponds to blocking layers and/or "anti-reflective" layers. The thickness of a dielectric layer is, for example, from 10 nm to 200 nm. This layer structure is generally obtained by a series of deposition operations that are carried out by a vacuum process such as field-supported magnetic cathode sputtering.

The transparent electrically conductive layer is a layer (single-layer or multi-layer, thus a stack) preferably with a total thickness less than or equal to 2 μm, in a particularly preferred way less than or equal to 1 μm.

As an example of a P-polarized light reflecting monosilver stack (for heads-up display applications for windshields) examples in patent application WO2021/004685 may be cited.

In the infrared transmission zone with the heating coating, the glazed unit may comprise on the side of face F2 (opposite face F1) an anti-reflective element at said working wavelength, the glazed unit with said anti-reflective element having a total transmission of at least 75% or 80% or 85.0%, or 90% at the working wavelength, particularly 905±30 nm and/or 1550±30 nm (for a LIDAR), particularly measured at an angle of incidence of 0°, or even preferably with a total transmission of at least 75% or 80% or 85.0%, measured at an angle of incidence of 60°.

The anti-reflective element may be an anti-reflective coating or a surface which is textured (surface treatment etc), particularly nanotextured.

In particular, an anti-reflective coating is further away from face F2 than the heating coating and has a free surface on the passenger compartment side.

The anti-reflective coating can comprise a chemical protection underlayer, preferably with a refractive index at 550 nm, between the substrate's refractive index n0 at 550 nm and the anti-reflective layer's refractive index n1 at 550 nm, particularly with a thickness of at most 200 nm for example, particularly a dense silica layer, by sol-gel with a sol-gel functional layer of porous silica on top.

The anti-reflective coating can be on a substrate (particularly glass) selected from:

- the first glass sheet, particularly made of extra-clear glass, on face F2 bare or coated with a functional coating such as the heating coating, the glazed unit being monolithic, in particular side window or rear window.
- or when the glazed unit is laminated and includes the lamination interlayer and the second glass sheet:
- the second sheet of glass, particularly extra-clear glass, anti-reflective coating on bare face F4 or coated with a functional coating (such as the heating coating or even on face F2 or F3),
- or a part, on the free face, which is transparent to said working wavelength and which is under and/or in a through-hole (in particular in and even partially under) of the second glass sheet (in the infrared transmission zone), in particular a piece on the lamination interlayer with a possible blind hole (part protruding or not under the through-hole) or glued on face F2, the lamination interlayer being pierced by an interlayer through-hole in line with said through-hole,
- the first glass sheet, on face F2 (bare or coated with a functional coating such as the heating coating), the lamination interlayer being perforated by an interlayer through-hole in line with a through-hole of the second glass sheet (in the infrared transmission zone)

The infrared transmission zone can be open on the edge of the glass, and the heating coating can be open or spaced from the edge of the glass by at least 3 cm or 5 cm or 1 cm (to avoid corrosion for example).

The infrared transmission zone (particularly the through-hole and/or the heating coating and/or a gap of an opaque layer) can be centimetric, particularly with a smaller dimension of at least 3 or 5 cm and preferably with a larger dimension of at most 70 cm or 50 cm.

For example, the infrared transmission zone (in particular the through-hole and/or the heating coating and/or a gap of an opaque layer) can be (taken from edge to edge, in particular horizontally, on a surface of the glazed unit, for example the first sheet of glass) at most 30 cm high (and at least centimetric, of at least 5 cm) and at most 70 cm or 50 cm long (and at least centimetric, at least 5 cm or 10 cm).

The infrared transmission zone (particularly the through-hole and/or the heating coating and/or a gap of an opaque layer) may be in particular of convex cross-section especially preferably trapezoidal, or circular or oval or ellipsoid or even rectangular, square . . . .

The infrared transmission zone (particularly of extent defined by the surface of the first glass sheet in this zone) can be:

- closed, notably spaced from the nearest edge of the glass by at least 3 cm or 5 cm
- open on the edge of the glass.

There may be another infrared transmission zone (of centimetric size), disjoint from said infrared transmission zone (in particular of similar size and/or shape to said infrared transmission zone), in particular one dedicated for the transmitter and the other for the receiver of the infrared detection system (Lidar).

The heating coating may be:

- a heating coating common to both infrared transmission zones (especially if the heating coating is on a film covering both infrared transmission zones)
- or there is a heating coating according to the invention for each of the infrared transmission zones in particular:
- two heating coatings on two parts in two separate through-holes of the second glass sheet
- or two disjoined heating coatings on a film (polymer, UTG) particularly submillimeter covering both infrared transmission zones.

Naturally, in one embodiment, if use is made of a multispectral detection (vision) system (in the near infrared range and the visible range) it may also be desired that in the infrared transmission zone, the glazed unit potentially comprising said anti-reflective element (anti-reflective coating or textured surface) has a total transmission of at least 90%, 91%, or even 92% at another working wavelength in the visible range, particularly between 400 nm and 700 nm, particularly measured at the normal.

In order to quantify the transmission of the glass in the visible range, a light transmission factor, referred to as light transmission, is often defined, often abbreviated to "$T_L$", calculated between 380 and 780 nm and applied to a glass thickness of 3.2 mm or 4 mm, according to ISO standard 9050:2003, thus taking into account the illuminant D65 as defined by ISO/CIE standard 10526 and the C.I.E 1931 standard colorimetric observer as defined by ISO/CIE standard 10527.

Naturally, the light transmission $T_L$ of the glazed unit (central zone of the windshield) is preferably at least 70% or 75%, 80% or 85%, 88%.

Preferably, the anti-reflective element comprises, or even consists of, an anti-reflective coating on the interior surface or face F2 or F4.

In particular,

- the anti-reflective coating can comprise, or even consists of, a stack of thin dielectric layers (of oxide and/or of metal or silicon nitrides, for example) alternating high and low refractive indices at the working wavelength, particularly a stack obtained by physical vapor deposition, PVD.
- or the anti-reflective coating may comprise, or even consist of, a porous silica layer, in particular a nanoporous silica gel sol layer, particularly with a degree of porosity of 20% to 70% particularly 35% to 65% and even 40% to 50%.

The anti-reflective coating can also comprise an overlayer if it does not alter the anti-reflective properties.

The anti-reflective coating particularly of porous silica according to the invention can have a thickness advantageously of between 50 nm and 1 μm and more preferentially between 70 and 500 nm.

In a porous silica embodiment, the porous layer can also be of the sol-gel type as described in document WO2008/059170. The porous layer can thus be obtained with pore-forming agents which are preferably polymeric beads.

The layer of porous (or nanoporous) silica can have closed pores of at least 20 nm, 50 nm or 80 nm optionally with pores having a concentration increasing in the direction of the free surface.

It is preferred for the majority of the closed pores, or at least 80% of them, to have a substantially identical shape, particularly elongated, substantially spherical or oval-shaped.

The porous silica can be doped for example to further improve its hydrolytic content in the case of applications which require great strength (façades, exteriors, etc.).

The anti-reflective coating, particularly the layer of porous silica (sol-gel) can comprise a chemical protection underlayer particularly with a thickness of at most 200 nm for example, particularly a dense silica layer, by sol-gel with a sol-gel functional layer of porous silica on top. The underlayer can be based on silica or at least partially oxidized derivatives of silicon selected from silicon dioxide, sub-stoichiometric silicon oxides, oxycarbide, oxynitride or oxycarbonitride of silicon.

The underlayer is useful when the underlying surface is made of soda-lime-silica glass because it acts as a barrier to the alkalis.

This underlayer therefore advantageously comprises Si, O, optionally carbon and nitrogen. But it can also include minority materials relative to the silicon, for example metals like Al, Zn or Zr. The underlayer can be deposited by sol-gel or by pyrolysis, particularly by gas-phase pyrolysis (CVD). This underlayer preferably has a thickness of at least 5 nm, particularly a thickness of between 10 nm and 200 nm, for example between 80 nm and 120 nm.

It is also possible to place an anti-reflective element (anti-reflective coating or textured surface) on face F1.

Face F1 may further comprise a functional layer: hydrophobic, etc.

The glazed unit can be laminated.

The first glass sheet may have a total iron oxide content by weight of at most 0.05% and the second glass sheet may have a total iron oxide content by weight of at most 0.05%.

The second glass sheet, particularly silica-based, soda lime-based, preferably soda-lime-silica-based, even aluminosilicate-based, or borosilicate-based, has a total iron oxide content by weight (expressed in the form $Fe_2O_3$) of at least 0.4% and preferably of at most 1.5%.

The first glass sheet, particularly silica-based, soda-lime-based, soda-lime-silica-based, or aluminosilicate-based, or borosilicate-based, has a total iron oxide content by weight (expressed in the form $Fe_2O_3$) of at most 0.05% (500 ppm), preferably of at most 0.03% (300 ppm) and of at most 0.015% (150 ppm) and particularly greater than or equal to 0.005%. The redox of the first glass sheet is preferably greater than or equal to 0.15.

Iron oxide, present as an impurity in most of the natural raw materials used in glassmaking (sand, feldspar, limestone, dolomite, etc.), absorbs both in the visible and near-ultraviolet region (absorption due to the ferric ion $Fe^{3+}$) and especially in the visible and near-infrared region (absorption due to the ferrous ion $Fe^{2+}$) this is why the iron oxide is reduced in the first glass sheet.

In the second glass sheet, the choice can be made to have a higher level of iron oxide in the case of the through-hole.

In a configuration with the through-hole, the piece may be spaced from the wall (of the second glass sheet) by a distance of at least 0.1 mm or 0.3 mm and no more than 3 mm or 0.7 mm. The surface of the piece can be under flush to face F4, flush to face F4, over flush to face F4.

It is preferred for the piece to be spaced apart (empty or filled space), but not too much, to retain its safety function.

The thickness of the part, in particular made of glass, preferably extra-clear or polymer, can be at least 0.1 mm or even at least 0.3 mm, and at most 1.5 mm or even at most 1.2 mm or 1 mm or 0.9 mm or 0.75 mm (depending on the level of transmission required and/or the security reinforcement required).

As an example of thin glass we can mention the Gorilla® glass from Corning, aluminosilicate glass and possibly chemically tempered.

The piece can be curved (convex), following the curvature of the first glass sheet; particularly, the piece is curved and is a tempered glass which follows the curvature of the first glass sheet.

The curved, particularly convex, piece (particularly made of glass) may follow the curvature of the first glass sheet. In one embodiment, this piece is bent simultaneously to the first and second glass sheets.

Examples of bending (of the glass sheets and/or of the part) are unpressed or pressed gravity bending or else tempered or semi-tempered bending.

If the glass piece undergoes a tempering bending, the piece is curved and is tempered glass.

The curved piece (particularly made of glass) may follow the curvature of the first glass sheet. The piece may be made of (thin) tempered, and even curved, glass.

The piece may be mineral. It preferably comprises at least 90% or 95 or 99% or 100% by weight of mineral material. The piece can be made of glass, in particular tempered (thermally) or chemically tempered, or annealed or even without thermal treatment.

This may be a silica-based, soda-lime-based, soda-lime-silica-based, or aluminosilicate-based, or borosilicate-based glass which has a total iron oxide content by weight (expressed in the form $Fe_2O_3$) of at most 0.05% (500 ppm), preferably of at most 0.03% (300 ppm) and of at most 0.015% (150 ppm) and particularly greater than or equal to 0.005%.

The piece may be made of K9 borosilicate or BK7 fused silica glass or else made of glass described in applications WO2014128016 or WO2018015312 or WO2018178278.

The part, particularly curved following the curvature of the first glass sheet may be made of glass, in particular tempered glass, having a total iron oxide content by weight of at most 0.05%, in particular extra-clear glass, particularly soda-lime-silica glass and particularly of identical (or similar) composition to the composition of the glass of the first glass sheet, particularly soda-lime-silica.

The piece may alternatively be made of BaF2, CaF2,

At least a fraction of the thickness of the piece is in the through-hole, and even the thickness of the piece is in the through-hole.

The connecting surface is preferably flush under face F3 (particularly lamination interlayer with partial hole or locally reduced thickness) or flush with face F3 or flush over face F3 (in the through-hole), for example an interlayer overthickness via the connecting film, here integral with the interlayer added before lamination, etc., and/or the interior surface being under flush (in the through-hole), flush with, or over flush to face F4.

In one embodiment, the laminated glazed unit comprises in the infrared transmission zone at most one functional polymer film (with or without a coating, in particular said heating coating on one or both sides) distinct from the lamination interlayer, under face F3 (with or without through-hole).

The lamination interlayer can comprise a PVB, optionally comprising PVB/functional film such as polymer film with athermal coating/PVB, optionally acoustic PVB, PVB optionally having an interlayer through-hole or preferably a partial through-hole in line with the through-hole.

The interlayer through-hole or partial through-hole, if any, can be wider than the second through-hole (at least before lamination) in particular by at most 5 mm or 10 mm.

Preferably, the bare or coated connecting surface is in adhesive contact with face Fb (without glue, without adhesively bonded polymer film).

Without departing from the scope of the invention, the lamination interlayer clearly can comprise several different types of laminations made of thermoplastic material, for example, with different hardnesses in order to provide an acoustic function, as disclosed, for example, in publication U.S. Pat. No. 6,132,882, particularly a set of PVB laminations with different hardnesses. Similarly, one of the glass sheets can be thin compared to the thicknesses conventionally used.

According to the invention, the interlayer can have a wedge-shape, particularly in view of an HUD (Head Up Display) application.

As a common lamination interlayer, other than PVB, a flexible polyurethane PU, a thermoplastic without plasticizer such as ethylene-vinyl acetate copolymer (EVA), an ionomer resin can be cited. These plastics have a thickness, for example, of between 0.2 mm and 1.1 mm, particularly 0.3 and 0.7 mm.

As already mentioned, the glazed unit can comprise, between face F2 and Fa, an opaque masking layer particularly an enamel (black etc.) on face F2 and/or on face Fa (in particular on Fa an ink, particularly black, etc.), at the edge of the infrared transmission zone (of said through-hole if any) between face F2 and Fa, in particular on the peripheral zone and even central and preferably along the longitudinal edge of the glazed unit.

The masking layer is for example on face F2 and the camouflaging coating is on the masking layer or under the masking layer and/or the masking layer is on face Fa and the camouflaging coating on face F2 is in contact with the masking layer.

The masking layer can then have a gap in line with the infrared transmission zone (of said through-hole if any) at least in the central zone and preferably which protrudes by at most 50 mm, 30 mm or 20 mm or 10 mm, 7 mm or 5 mm in the infrared transmission zone (of said through-hole if any).

The masking layer can be at 2 mm or 3 mm (less than 5 mm) from the edge face of the glazed unit (closest).

The masking layer can be a band framing the glazed unit (windshield etc.) particularly in black enamel. A gap is thus created in this masking layer.

Another masking layer (particularly black enamel etc.) can be on face F3 or F4 particularly facing toward the masking layer (and even of identical nature, for example a particularly black enamel).

Naturally, the most desirable application is that the glazed unit be a windshield for a road vehicle (automobile) or even for a rail vehicle (at moderate speed).

The second glass sheet is particularly green, blue, gray. The second glass sheet can be green by the $Fe_2O_3$ or blue with CoO and Se or gray with Se and CoO.

The glasses of the applicant called TSAnx (0.5 to 0.6% iron) TSA2+, TSA3+(0.8 to 0.9% iron), TSA4+(1% iron), TSA5+, for example green, can be particularly mentioned.

TSA3+(2.1 mm) for example has a total transmission at 905 mm of about 40% and at 1550 mm of about 50%.

The second glass sheet can have a redox, defined as being the ratio between the content by weight of FeO (ferrous iron) and the total iron oxide content by weight (expressed in the form $Fe_2O_3$) between 0.22 and 0.35 or 0.30.

Said second glass sheet can have a chemical composition that comprises the following constituents in a content varying within the limits by weight defined hereinafter:

| | |
|---|---|
| $SiO_2$ | 64-75% |
| $Al_2O_3$ | 0-5% |
| $B_2O_3$ | 0-5%, |
| CaO | 2-15% |
| MgO | 0-5% |
| $Na_2O$ | 9-18% |
| $K_2O$ | 0-5% |
| $SO_3$ | 0.1-0.35% |
| $Fe_2O_3$ (total iron) | at least 0.4% and even 0.4 to 1.5%, |
| Optionally redox | 0.22-0.3 |

And particularly less than 0.1% impurities.

The first glass sheet can for example be a soda-lime-silica glass such as Saint-Gobain Glass's Diamant®, or Pilkington's Optiwhite®, or Schott's B270®, or AGC's Sunmax® or of other composition described in document WO04/025334. The Planiclear® glass from the Saint-Gobain Glass company can also be chosen.

The laminated glazed unit according to the invention, in particular for a private car (windshield etc.) or truck, can be curved (bent) in one or more directions particularly with, for the first sheet, the second sheet and optionally the part, a radius of curvature of 10 cm to 40 cm. It can be flat for buses, trains, tractors.

With ordinary natural raw materials, the total content by weight of iron oxide is of the order of 0.1% (1000 ppm). To reduce the iron oxide content, particularly pure raw materials can be selected.

In the present invention, the $Fe_2O_3$ content (total iron) of the first glass sheet is preferably less than 0.015%, even less than or equal to 0.012%, particularly 0.010%, in order to increase the near-infrared transmission of the glass. The $Fe_2O_3$ content is preferably greater than or equal to 0.005%, particularly 0.008% so that the cost of the glass is not a disadvantage.

In order to further increase the infrared transmission of the first glass sheet, the ferrous iron content can be reduced in favor of the ferric iron, thus oxidizing the iron present in the glass. Thus, the desire is for glasses having the lowest possible redox, ideally zero or nearly 0. This number can vary between 0 and 0.9 of zero redoxes corresponding to a totally oxidized glass.

Glasses comprising low quantities of iron oxide, particularly less than 200 ppm, even less than 150 ppm, have a natural tendency to have high redoxes, greater than 0.4, even 0.5. This tendency is probably due to the displacement of the oxidation-reduction equilibrium of the iron based on the content of iron oxide. The redox of the first glass sheet is preferably greater than or equal to 0.15, and particularly between 0.2 and 0.30, particularly between 0.25 and 0.30. Indeed, excessively low redoxes contribute to reducing the working life of the furnaces.

Said first glass sheet can have a chemical composition that comprises the following constituents in a content varying within the limits by weight defined hereinafter:

| | |
|---|---|
| $SiO_2$ | 60-75% |
| $Al_2O_3$ | 0-10% |
| $B_2O_3$ | 0-5%, preferably 0 |
| CaO | 5-15% |
| MgO | 0-10% |
| $Na_2O$ | 5-20% |
| $K_2O$ | 0-10% |
| BaO | 0-5%, preferably 0, |
| $SO_3$ | 0.1-0.4% |
| $Fe_2O_3$ (total iron) | 0 to 0.015%, |
| and redox | 0.1-0.3. |

Throughout the text, the percentages are percentages by weight.

In addition, the piece may have a chemical composition that comprises the following constituents in a content varying within the limits by weight defined hereinafter:

| | |
|---|---|
| $SiO_2$ | 60-75% |
| $Al_2O_3$ | 0-10% |
| $B_2O_3$ | 0-5%, preferably 0 |
| CaO | 5-15% |
| MgO | 0-10% |
| $Na_2O$ | 5-20% |
| $K_2O$ | 0-10% |
| BaO | 0-5%, preferably 0, |
| $SO_3$ | 0.1-0.4% |
| $Fe_2O_3$ (total iron) | 0 to 0.015%, |
| and redox | 0.1-0.3. |

The glass sheets (and even the part) are preferably formed by floating on a tin bath. Other types of forming methods can be used, such as drawing methods, down-draw method, lamination method, Fourcault method, etc.

The glass composition of the first glass sheet (and even the part) can comprise, other than the inevitable impurities contained particularly in the raw materials, a small proportion (up to 1%) of other constituents, for example agents aiding in the melting or refining of the glass (Cl . . . ), or still elements resulting from the dissolving of the refractories used in the construction of the furnaces (for example $ZrO_2$). For the reasons already mentioned, the composition according to the invention preferably does not comprise oxides such as $Sb_2O_3$, $As_2O_3$ or $CeO_2$.

The composition of the first glass sheet (and even of the part) preferably does not comprise any infrared absorbing agent (particularly for a wavelength comprised between 800 and 1800 nm). In particular, the composition according to the invention preferably does not contain any of the following agents: oxides of transition elements such as CoO, CuO, $Cr_2O_3$, NiO, $MnO_2$, $V_2O_5$, rare earth oxides such as $CeO_2$, $La_2O_3$, $Nd_2O_3$, $Er_2O_3$, or coloring agents in elemental state such as Se, Ag, Cu. Among the other agents also preferably excluded are oxides of the following elements: Sc, Y, Pr, Sm, Eu, Gd, Tb, Dy, Ho, Tm, Yb, Lu. These agents often have a very powerful undesirable coloring effect, appearing at very small quantities, sometimes on the order of a few ppm or less (1 ppm=0.0001%). Their presence thus very greatly reduces the transmission of the glass.

Preferably, the first glass sheet (and even the part) has a chemical composition that comprises the following constituents in a content varying within the limits by weight defined hereinafter:

| | |
|---|---|
| $SiO_2$ | 60-75% |
| $Al_2O_3$ | 0-10% |
| $B_2O_3$ | 0-5%, preferably 0 |
| CaO | 5-15% |
| MgO | 0-10% |
| $Na_2O$ | 5-20% |
| $K_2O$ | 0-10% |
| BaO | 0-5%, preferably 0, |
| $SO_3$ | >0.2-0.4% |
| $Fe_2O_3$ (total iron) | 0 to 0.015%, |
| And redox | 0.2-0.30. |

The first glass sheet (and even the part) can have a chemical composition that comprises the following constituents in a content varying within the limits by weight defined hereinafter:

$SiO_2$ 60-75%

| | |
|---|---|
| $Al_2O_3$ | 0-10% |
| $B_2O_3$ | 0-5%, preferably 0 |
| CaO | 5-15% |
| MgO | 0-10% |
| $Na_2O$ | 5-20% |
| $K_2O$ | 0-10% |
| BaO | 0-5%, preferably 0, |
| $SO_3$ | 0.1-0.4% |
| $Fe_2O_3$ (total iron) | 0 to 0.02%, |
| And redox | 0.15-0.3. |

In the present invention, the $Fe_2O_3$ content (total iron) is preferably less than 0.015%, even less than or equal to 0.012%, particularly 0.010%, in order to increase the near infrared transmission of the glass. The $Fe_2O_3$ content is preferably greater than or equal to 0.005%, particularly 0.008%, so that the cost of the glass (of the second glass sheet and the part) is not a disadvantage.

The redox is preferably greater than or equal to 0.15, and particularly between 0.2 and 0.30, particularly between 0.25 and 0.30. Indeed, excessively low redoxes contribute to reducing the working life of the furnaces.

In the glasses according to the invention (first sheet, second sheet and even the part), the silica $SiO_2$ is generally maintained within narrow limits for the following reasons. Above 75%, the viscosity of the glass and its aptitude for devitrification increase greatly, which makes its melting and pouring onto the molten tin bath more difficult. Below 60%, particularly 64%, the hydrolytic resistance of the glass decreases rapidly. The preferred content is between 65 and 75%, particularly between 71 and 73%.

Other preferred compositions according to the invention for the first glass sheet, indeed even for the part, are reproduced hereinafter:

| | |
|---|---|
| $SiO_2$ | 65-75% |
| $Al_2O_3$ | 0-3% |
| CaO | 7-12% |
| MgO | 2-5% |
| $Na_2O$ | 10-15% |
| $K_2O$ | 0-5% |
| $SO_3$ | 0.1-0.3% |
| $Fe_2O_3$ (total iron) | 0 to less than 0.015%, |
| And redox | 0.1-0.3. |

Other preferred compositions according to the invention for the first glass sheet, indeed even for the part, are reproduced hereinafter:

| | |
|---|---|
| $SiO_2$ | 65-75% |
| $Al_2O_3$ | 0-5% |
| CaO | 7-12% |
| MgO | 1-5% |
| $Na_2O$ | 10-15% |
| $K_2O$ | 0-5% |
| $SO_3$ | 0.2-0.4% |
| $Fe_2O_3$ (total iron) | 0 to less than 0.015%, |
| And redox | 0.1-0.3. |

The invention also relates to a device, which comprises: the glazed unit as previously described an infrared detection (vision) system at the working wavelength in the infrared (or even multi-spectral, also in the visible range, particularly between 500 and 600 nm), arranged in the passenger compartment behind said glazed unit and comprising a transmitter and/or receiver, so as to transmit and/or receive radiation passing through the first glass sheet at the infrared transmission zone.

The infrared detection system is preferably a LIDAR or a near-infrared camera.

The infrared vision system (LIDAR) can be of different technologies. It makes it possible to measure the vehicle's environment by determining the distance of the object closest to the vehicle in a wide range of angular directions. Thus, the vehicle's environment can be reconstituted in 3D. The technology employed is based on sending a light beam and receiving it after it has diffusely reflected off an obstacle. This can be done by a rotating source, scanned by micro-electromechanical systems (MEMS) or by a fully solid system. A single flash of light can thus illuminate the whole environment.

For all these technologies, the light must pass through the glazed unit twice, when outgoing and when incoming, which explains the necessity to have a glazed unit with excellent transparency at the working wavelength of the LIDAR.

The speed can also be measured with DOPPLER technology.

The infrared vision system (LIDAR) is preferably spaced apart from the anti-reflective element.

The piece in the through-hole according to the invention is preferably spaced apart from the infrared vision system (LIDAR) and/or does not serve for the attachment of same. The infrared vision system (LIDAR) can be facing or offset from said through-hole (and from the part), for example an optical system is between the piece and the of the infrared vision system (LIDAR).

The infrared vision system (LIDAR) is for example attached via face F4 and/or the bodywork, the roof trim. The infrared vision system (LIDAR) can be offset.

The infrared vision system (LIDAR) is for example integrated in a plate or a multifunction base able to (designed to) optimize the positioning thereof relative to the windshield (and the piece if any) by being adhesively bonded to face F4.

Some advantageous but non-limiting embodiments of the present invention are described hereafter, which of course can be combined as appropriate. The views are not to scale.

Figure 6A:
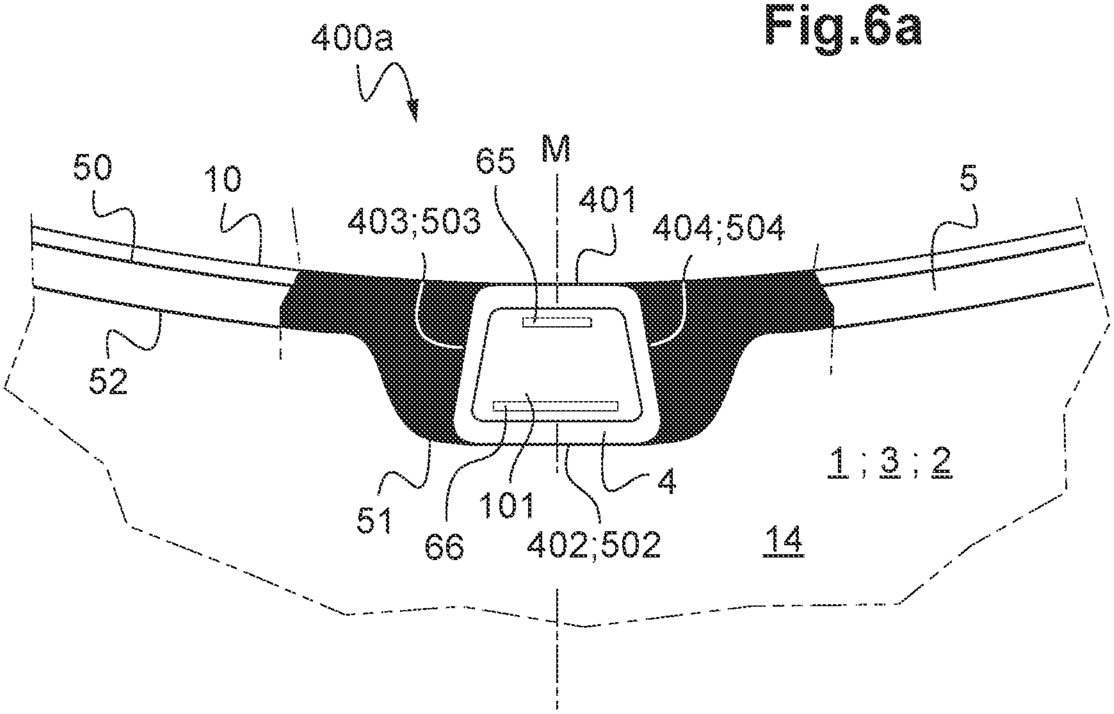

FIG. 6*a* shows schematically in cross sectional view a windshield 400*a* according to the invention with an infrared vision system such as a LIDAR in a fourth embodiment of the invention.

Figure 6B:
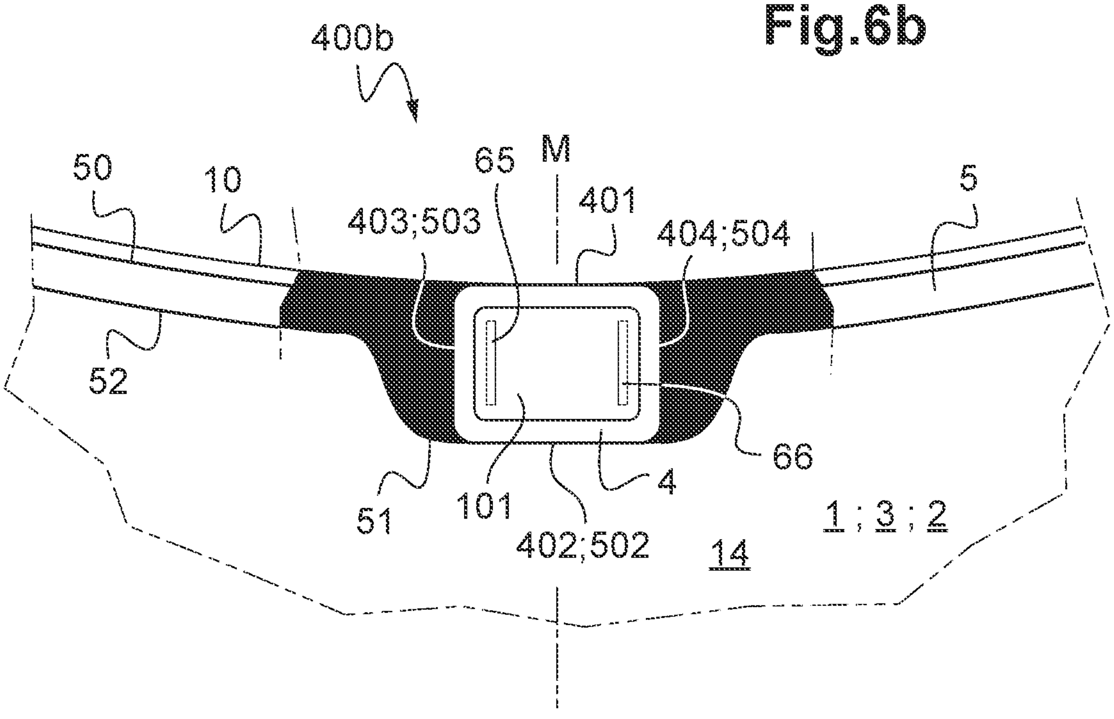

FIG. 6*b* shows schematically in cross sectional view a windshield 400*b* according to the invention with an infrared vision system such as a LIDAR in a variant of the fourth embodiment of the invention.

Figure 7:
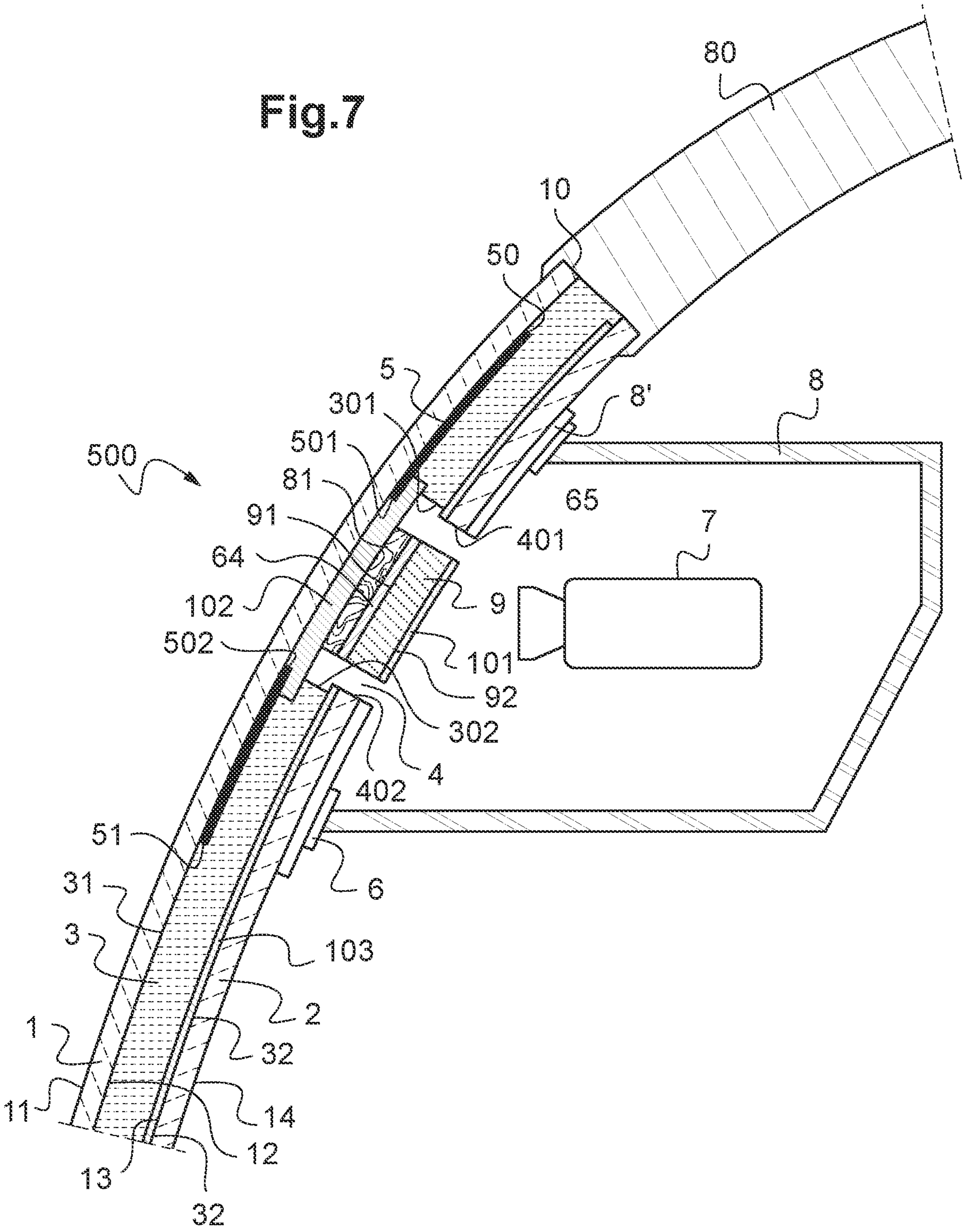

FIG. 7 shows a schematic sectional view a of windshield 500 according to the invention, with an infrared vision system such as a LIDAR in a fifth embodiment of the invention.

Figure 8:
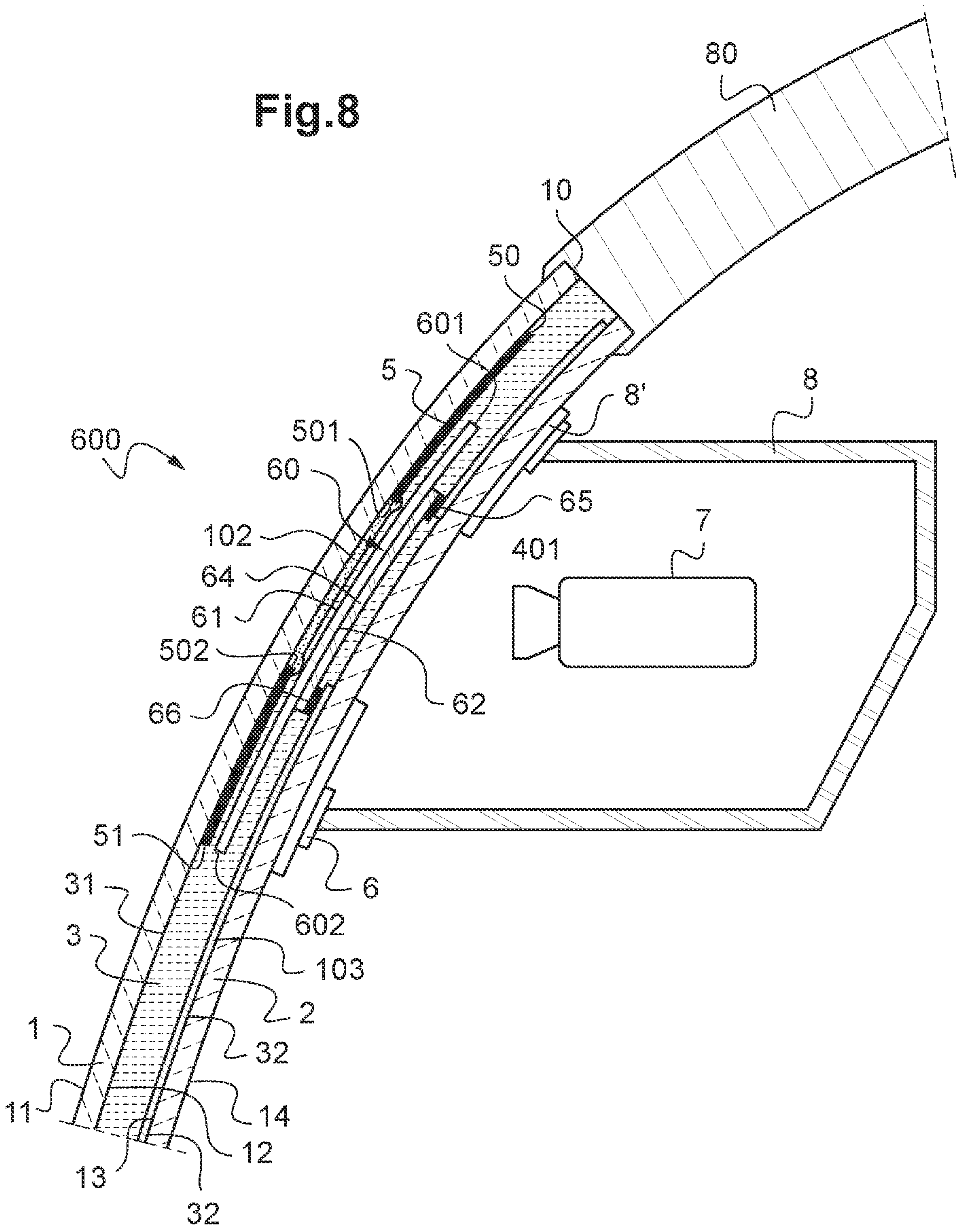

FIG. 8 shows a schematic sectional view of a windshield 600 according to the invention, with an infrared vision system such as a LIDAR in a sixth embodiment of the invention.

Figure 9:
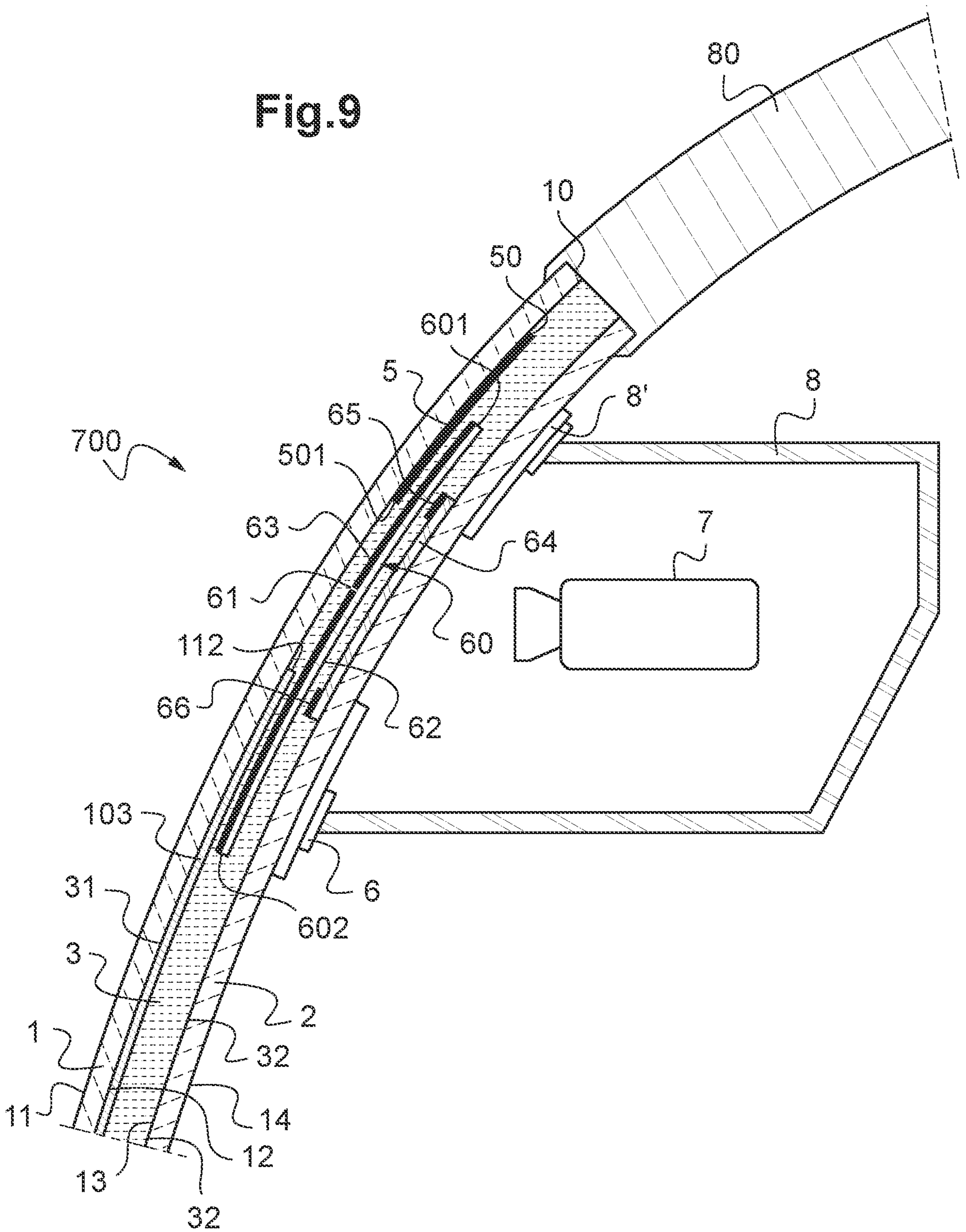

FIG. 9 shows a schematic sectional view of a windshield 700 according to the invention, with an infrared vision system such as a LIDAR in a seventh embodiment of the invention.

Figure 1:
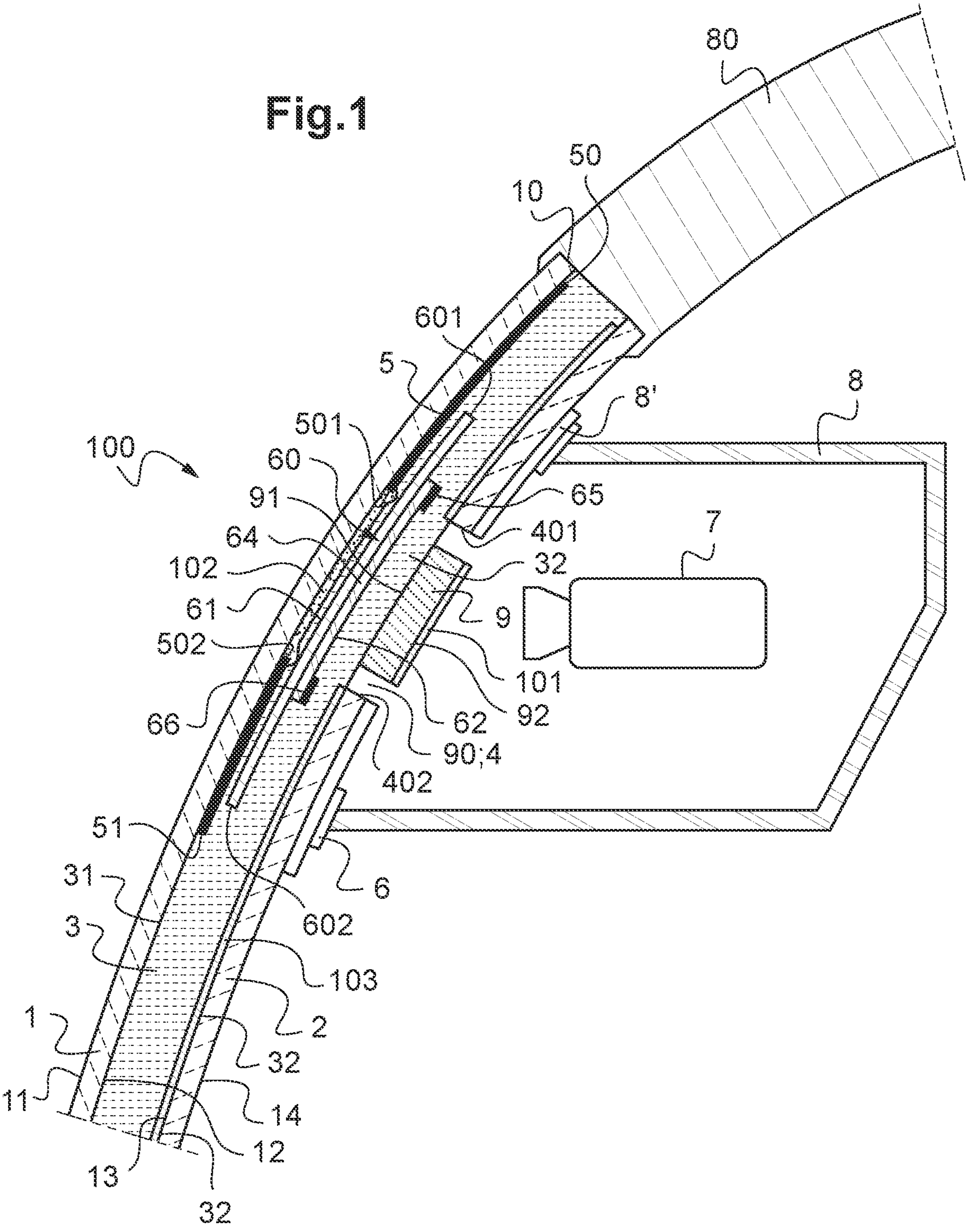
FIG. 1 shows schematically in cross sectional view a windshield 100 in a first embodiment of the invention with an infrared detection (vision) system such as a LIDAR or a near-infrared camera.

FIG. 1 shows schematically a windshield of a vehicle particularly a motor vehicle 100 according to the invention, with an infrared vision system such as a LIDAR at 905 nm or 1550 nm comprising a transmitter/receiver 7.

Figure 2:
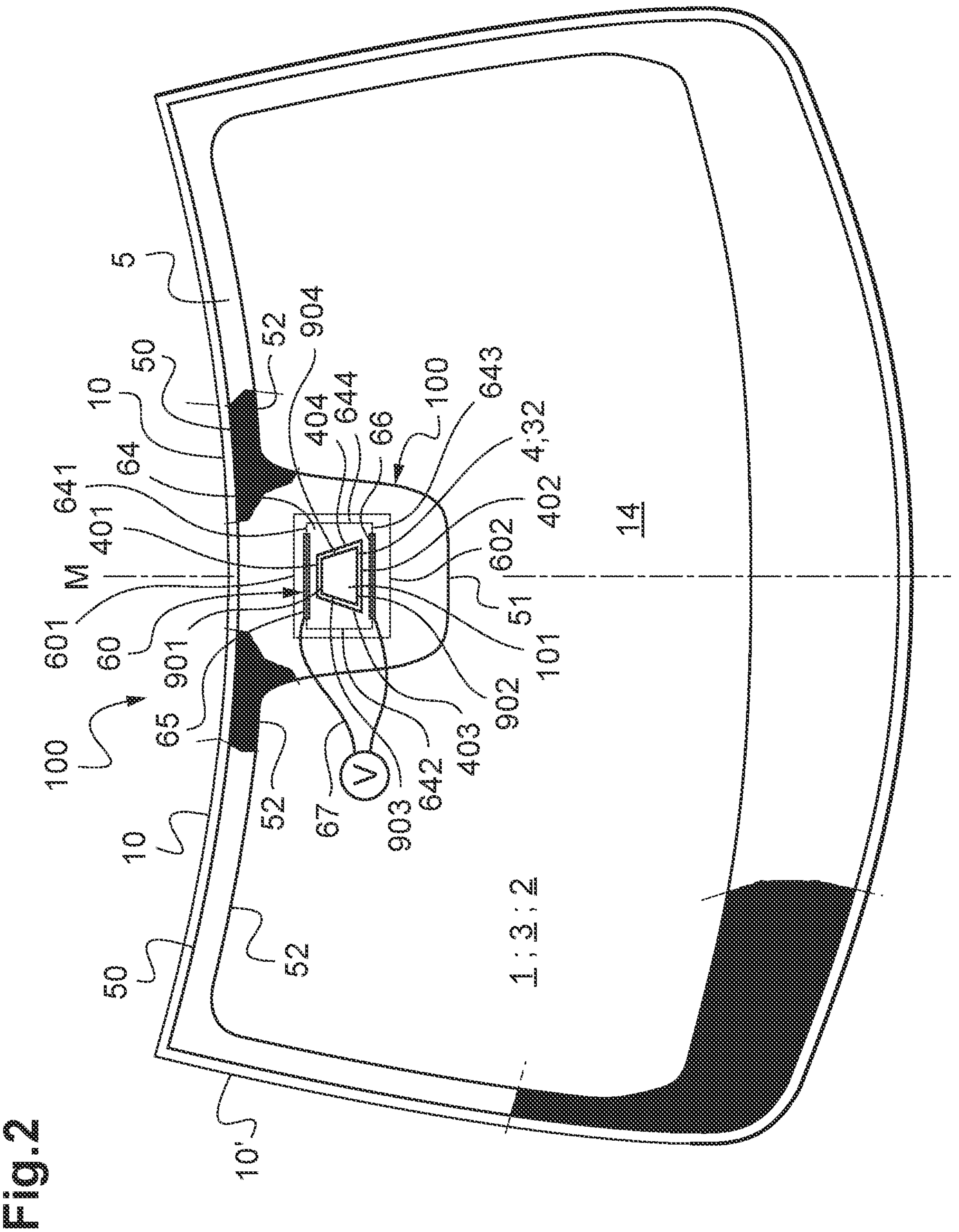
FIG. 2 shows a schematic front view (passenger compartment side) of the windshield 100 of the first embodiment of the invention.

FIG. 2 shows a schematic front view (passenger compartment side) of the windshield 100 of the first embodiment of the invention.

This vision system 7 is placed behind the windshield facing a zone that is preferably located in the central and upper piece of the windshield. In this zone, the infrared vision system is oriented at a certain angle relative to the surface of the windshield (face F4 14). In particular, the transmitter/receiver 7 can be oriented directly toward the image capture zone, in a direction that is nearly parallel to the ground, that is to say slightly inclined toward the road. In other words, the transmitter/receiver 7 of the LIDAR can be oriented toward the road at a slight angle with a field of vision suitable for fulfilling their functions.

As a variant, the receiver 7 is separate from the transmitter, particularly adjacent.

The windshield 100 is a curved laminated glazed unit comprising:

an external glass sheet 1, with an exterior face F1 and an interior face F2 and an internal glass sheet 2, for example with a thickness of 1.6 mm or even less, with an exterior face F3 and an interior face F4 on the passenger compartment side the two glass sheets being connected to one another by an interlayer made of thermoplastic material 3 (single or multi-laminations), most usually polyvinyl butyral (PVB), preferably clear, of submillimeter thickness optionally having a cross section decreasing in the shape of a wedge from the top to the bottom of the laminated glazed unit, for example a PVB (RC41 from Solutia or Eastman) with a thickness of about 0.76 mm, or as a variant if necessary an acoustic PVB (three-layer or four-layer), for example with a thickness of about 0.81 mm, for example an interlayer in three PVB laminations, PVB with a main internal face 31 and a main face 32.

The windshield of a road vehicle in particular is curved.

In a conventional and well-known way, the windshield is obtained by hot lamination of the first, second curved glass sheets 1, 2 and the interlayer 3. For example a clear PVB of 0.76 mm is selected.

The first glass sheet 1, particularly silica-based, soda-lime-based, soda-lime-silica-based (preferably), alumino-silicate-based, or borosilicate-based, has a total iron oxide content by weight (expressed in the form $Fe_2O_3$) of at most 0.05% (500 ppm), preferably of at most 0.03% (300 ppm) and at most 0.015% (150 ppm) and particularly greater than or equal to 0.005%. The first glass sheet can preferably have a redox greater than or equal to 0.15, and particularly between 0.2 and 0.30, particularly between 0.25 and 0.30. Particularly an OPTWHITE glass of 1.95 mm is selected.

The second glass sheet 2 particularly silica-based, soda lime-based, preferably soda-lime-silica-based (like the first glass sheet), even aluminosilicate-based or borosilicate-based, has a total iron oxide content by weight of at least 0.4% and preferably of at most 1.5%.

The glasses of the applicant called TSAnx (0.5 to 0.6% iron) TSA2+, TSA3+(0.8 to 0.9% iron), TSA4+(1% iron), TSA5+, for example green, can be particularly mentioned. For example a TSA3+ glass of 1.6 mm is selected.

According to the invention, in a central peripheral region along the upper longitudinal edge 10, the windshield **100*a*** comprises, in order to form an infrared transmission zone:

- a through-hole 4, here closed, of the second glass sheet 2, which hole 4 is thus delimited by a wall of the glass 401 to 404
- optionally in a variant with transmitter and separate receiver, close to the through-hole (which is for the receiver), another closed through-hole of the second glass sheet 2 (which is for the transmitter).

A central line M is defined passing through the middle of the upper edge which can be an axis of symmetry of the glazed unit.

The through-hole 4 can be central; then the line M passes through and divides it into two identical parts.

In said infrared transmission zone, the glazed unit comprises, within the lamination interlayer (for example between two PVB sheets), a functional heating element 60. It has an upper edge 601 under the enamel zone 5 and a lower edge 602 toward the center of the windshield.

The functional heating element 60 comprises a polymer sheet or support, for example PET of 100 μm, or extra-clear glass (a UTG of 200 or 100 μm), transparent to the working wavelength of the LIDAR with a first main face on the side of face F2 61 and with a second main face on the side of face F3 62. The support is rectangular in shape with horizontal longitudinal edges 601 and 602.

The second face 62 (alternatively the first main face 61) bears a heating coating 64 for example rectangular in shape (same shape as the film 60) facing the through hole 4 forming a local heating zone. The heating coating is made of material which is transparent to least at the "working" wavelength in the infrared, as will be detailed later.

The horizontal longitudinal edges or large sides 641, 643 of the layer 64 can be parallel to the large sides of the through-hole 4. The small sides 642, 644 of the layer 64 can be parallel to the small sides of the through-hole 4.

The rectangular heating zone 64 is provided with two electrical leads or first and second horizontal (dedicated) local busbars 65, 66 offset from the through-hole on either side of the large sides of the through-hole 4 supplied with power 67 for example at 15V or 48V, or even 12V or 24V, or even a higher voltage (for an electric vehicle in particular).

The length of the busbars is adapted to measure, preferably equal to or longer than the large sides of the through-hole.

In the case of a round or oval through hole, the substantially horizontal busbars can be curved to match the shape of the through-hole.

It might be sought to place the busbars as close together as possible in order to increase the power density.

The functional heating element 60 extends beyond the region of the through-hole 4. For example, the heating coating can cover the other possible through-hole, another transmission zone, especially infrared (for another detector etc.).

The functional heating element 60 can carry elements such as sensor(s) (antenna etc.) of the electroluminescent display, in particular on the face 62 on the F3 side, elements offset from the infrared transmission zone (under face F3).

The heating coating 64 comprising a heating layer of electrically conductive material transparent to said working wavelength which is a transparent conductive oxide comprising an oxide of indium and another metal selected from molybdenum and titanium, the other metal optionally in an oxidized state.

For example, the weight percentage of indium oxide is 98%, the weight percentage of molybdenum (optionally oxidized) or titanium (optionally oxidized) is 2%, the sum by weight of indium and titanium (optionally oxidized) or molybdenum (optionally oxidized) is at least 99% or 100%.

The heating coating further comprises at least one possible undercoat of oxy and/or metal or silicon nitride and/or at least one possible overcoat of oxy and/or metal or silicon nitride.

In the infrared transmission zone with the heating layer, the glazed unit has an infrared transmission of at least 70% at the working wavelength.

Table 1 shows as an example heating data (voltage, power) and the size of the heating layer (imposed by the transmission window), the resistance per square, the electrical resistivity and the thickness of the heating layer.

TABLE 1

| Example | Voltage (V) | Power ($W/m^2$) | Size ($cm^2$) | Rsq (Ohm) | Resistivity (μΩ · cm) | Thickness (nm) |
|---|---|---|---|---|---|---|
| 1 | 14 | 280 | 100 | 70 | 200 | 30 |
| 2 | 14 | 280 | 400 | 17.5 | 200 | 110 |
| 3 | 48 | 280 | 400 | 205 | 200 | 10 |
| 4 | 14 | 280 | 100 | 70 | 400 | 60 |
| 5 | 14 | 280 | 400 | 17.5 | 400 | 220 |
| 6 | 48 | 280 | 400 | 205 | 400 | 20 |
| 7 | 48 | 600 | 400 | 96 | 200 | 20 |
| 8 | 48 | 600 | 400 | 96 | 400 | 40 |

As shown in FIG. 2 (sectional view along M), the through-hole is here a closed hole (surrounded by the wall of the glass sheet), thus within the glazed unit particularly—with trapezoidal cross section—comprising:

- a first large side 401 or "upper" longitudinal edge closest to the edge face of the upper longitudinal edge of the glazed unit 10—parallel to this edge face—with a length of at most 20 cm for example 8 cm and spaced apart by at least 3 cm or 5 cm from the edge face 10 a second large side 402 or "lower" longitudinal edge (farthest from the edge face of the upper longitudinal edge 10, near the central zone) parallel to the first large side with a length of at most 70 cm or 50 cm or 20 cm and preferably greater than that of the first large side for example 14 cm, first and second small sides 403, 404, or oblique lateral edges.

The height (between the large sides 401, 402) is at least 3 cm, here 6 cm.

The other hole may be of the same size and the same shape. For example, they are two horizontal holes.

The through-hole can have rounded corners.

The through-hole 4 can alternatively be a notch, for example of trapezoidal shape or rectangular shape, thus a through-hole which preferably opens on the roof side (on the upper longitudinal edge 10).

The closed or opening through-hole 4 can be in another region of the windshield 100*a* or even in another glazed unit of the vehicle, in particular the rear window.

In the through-hole and optionally under the through-hole (under face F3) and/or overflush to face F4, a piece 9 is present, made of a material (particularly glass) which is transparent to least at the "working" wavelength in the infrared of the LIDAR in a range extending from 800 nm to 1800 nm, in particular from 850 nm to 1600 nm, particularly 905±30 nm and/or 1550±30 nm.

The piece 9 has a main "connecting" surface 91, here (and preferably) connected to the main face Fb with adhesive contact, and a main "interior" surface 92 opposite the connecting surface.

The piece has the same shape as the through-hole (two longitudinal edges 901 and 902 and two lateral edges 903, 904). The piece 9 has an edge face in contact with or spaced apart from the wall 401, 402 delimiting the through-hole by at most 5 mm, preferably spaced apart and by a distance of at most 2 mm and even ranging from 0.3 to 2 mm.

The interior surface comprising an element which is anti-reflective 101 at said working wavelength, for example an anti-reflective porous silica coating.

The piece is for example an extra-clear glass, soda-lime-silica, curved and thermally tempered.

The first glass sheet 1 and the piece 9 can be an OPTIWHITE® of 1.95 mm. The piece is alternatively a flexible extra-clear curved glass of 0.1 mm or 0.3 mm or 0.5 mm or 0.7 mm and optionally chemically tempered. For example, it is Gorilla® aluminosilicate glass.

The windshield 100*a* comprises on face F2 12 an opaque masking layer for example black 5, such as a layer of enamel or a lacquer, forming a peripheral frame of the windshield (or of the window) particularly along the upper longitudinal edge 10 of the glazed unit and particularly along the left lateral edge 10' of the glazed unit.

The external edge 50 of the masking layer 5 closest to the edge face 10 of the glazed unit may be spaced apart by 1 or 2 mm to several cm from the edge face 10 (longitudinal edge).

The opaque masking layer 5 here has a greater width in the central zone than in the other peripheral zones, on either side of the central zone. The masking layer 5 has an internal (longitudinal) edge 51 in the central zone of the windshield and an internal (longitudinal) edge 52 on either side of the central zone.

This central zone being provided with the closed hole 4 (FIG. 2), this masking layer 5 comprises:

in line with the first hole 4, a first gap that is large enough not to disrupt the performance of the transmitter/receiver (or of the separate receiver) 7, particularly slightly smaller than the through-hole 4 where appropriate, in the variant, in line with the other hole, a second gap that is large enough not to disrupt the performance 7 separate transmitter, particularly slightly smaller than the other through-hole.

The first gap here has the same trapezoidal shape as the hole 4 with two large sides 501, 502 and two small sides 503, 504. The first gap can be preferably of identical size or smaller than the hole 4 for example the walls 501 to 504 delimiting the first gap protruding by at most 50 mm or 10 mm or even 5 mm from the walls of the glass 401 to 404. As a variant, this is a rectangle or any other shape particularly inscribed in the surface of the through-hole (trapezoidal or another).

The masking layer 5 is capable of masking the casing 8 (plastic, metal, etc.) of the LIDAR 7. The casing 8 can be adhered to face F4 14 by an adhesive 6 and to the roof 80. The casing may be attached to a plate 8' mounted on face F4, with holes to allow said IR rays to pass.

In the infrared transmission zone, the first glass sheet 1 comprises, on face F2, a camouflaging coating 102 which is transparent to the working wavelength in the infrared and absorbs in the visible range.

The camouflaging coating 102 is here rectangular in shape in this peripheral region.

The edges of the camouflaging coating optionally protrude between face F2 12 and face Fa 31 for example at most by 10 mm or 5 mm from the walls 401 to 404 delimiting the through-hole 4. Here, the camouflaging coating 102 partially covers the optional masking layer 5 on face F2.

The camouflaging coating 102 alternatively has another shape, for example a shape homothetic to that of the section of the through-hole, thus for example a trapezoidal shape.

Face F3 13 comprises a conductive layer 103 for solar control or low emissivity, possibly heating, in particular a silver stack.

Possible variants are as follows (without being exhaustive), optionally cumulative:

the camouflaging coating 102 does not protrude from the through-hole and even is spaced apart from the edge of the through-hole, preferably by at most 1 cm or 5 mm the camouflaging coating 102 is spaced apart from the masking layer (for example which is on face F2 particularly of the enamel) or at least does not cover it.

Alternatively, the heating coating is:

on face F2 12 on the second glass sheet 2, preferably on the main face F3 13 opposite face F2 12 on the piece 9 particularly the side facing face F2.

The functional heating element 60 can also serve as camouflage by adding a camouflaging coating as described previously (especially if the piece 9 is transparent). Its extent is adapted, the camouflaging coating can be preferably on face 61, here opposite the heating layer or alternatively even on all or part of the heating layer and the busbars.

Figure 3:
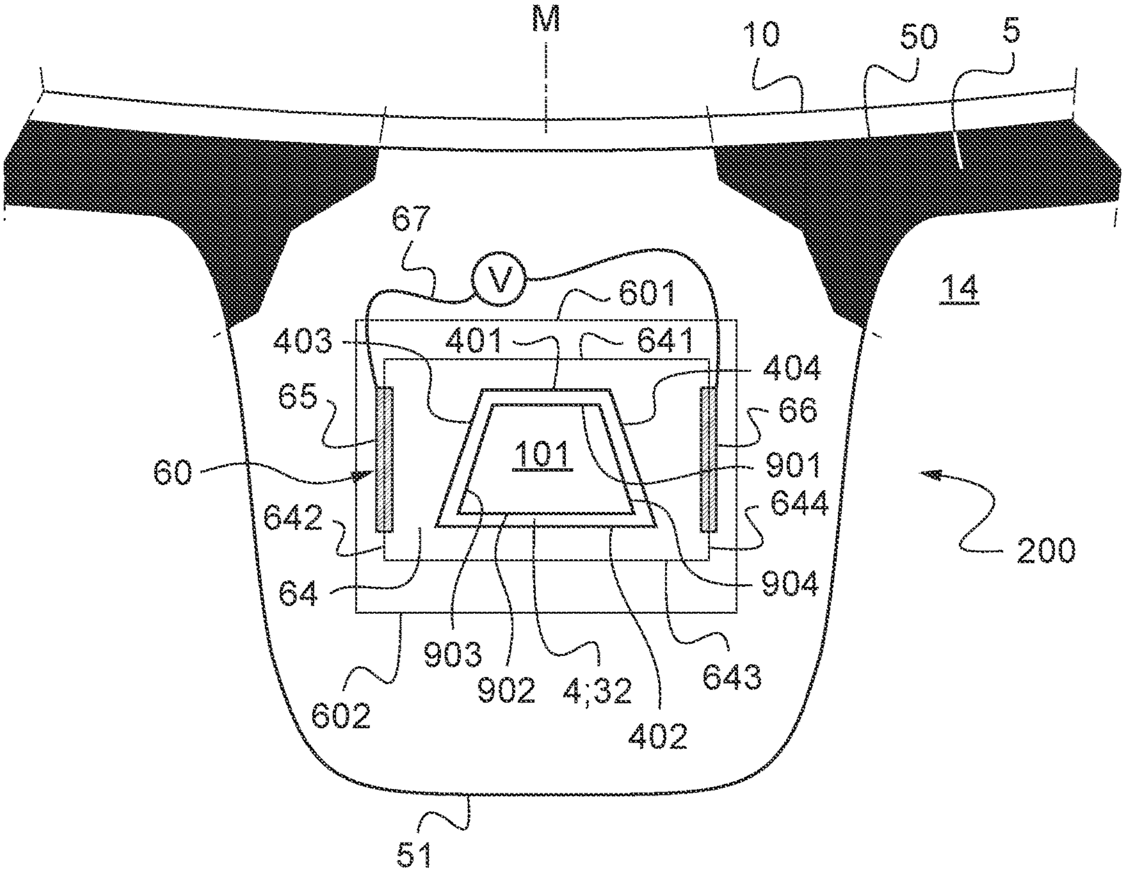
FIG. 3 shows schematically in cross sectional view a windshield 200 according to the invention with an infrared vision system such as a LIDAR in a second embodiment of the invention.
Figure 4:
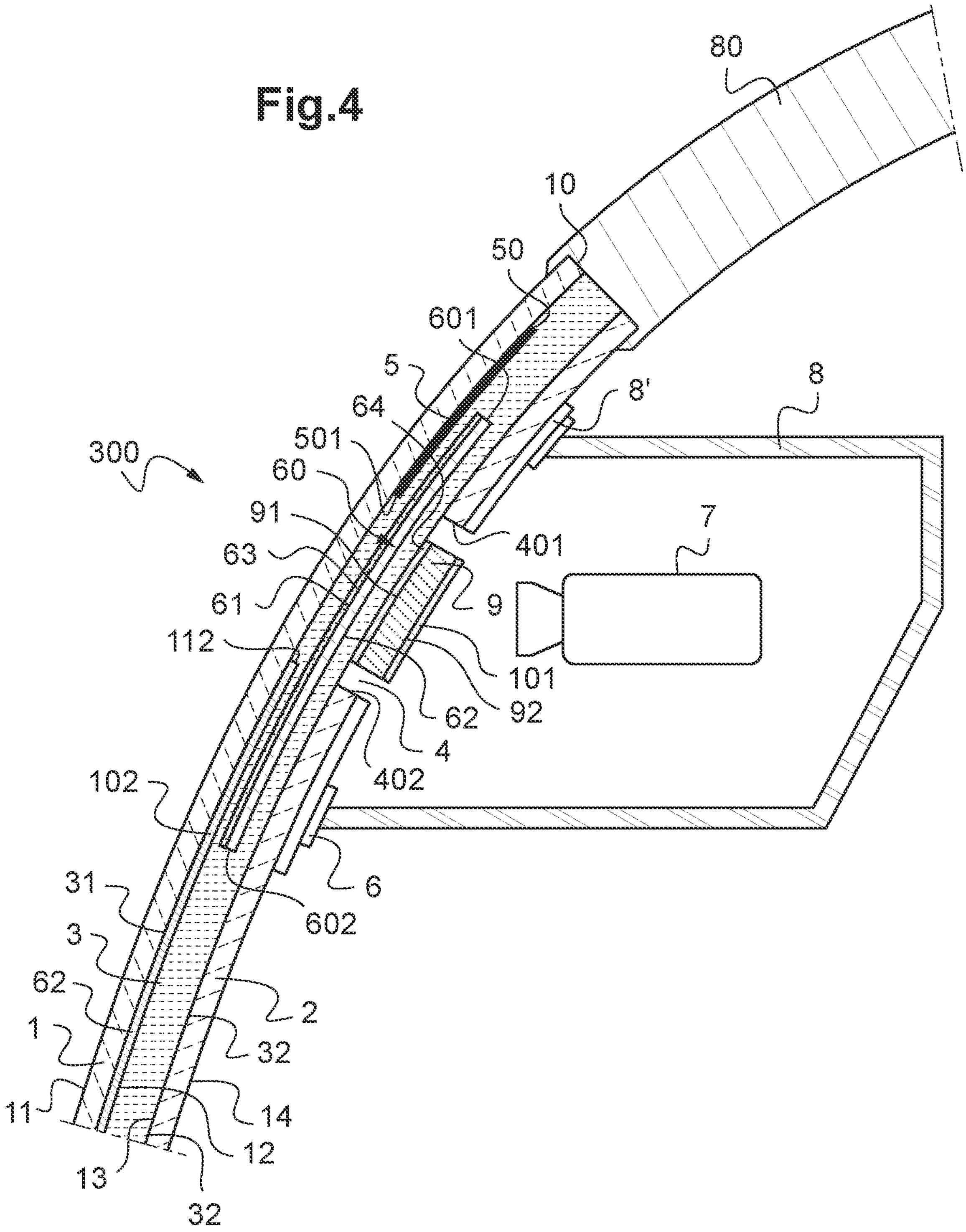
FIG. 4 shows a schematic sectional view of a windshield 300 according to the invention with an infrared vision system such as a LIDAR in a third embodiment of the invention.

FIG. 3 shows schematically in cross sectional view a windshield 200 according to the invention with an infrared vision system such as a LIDAR in a second embodiment of the invention. FIG. 4 shows a schematic front view (passenger compartment side) of this windshield 200.

Only the differences with the first embodiment are explained hereunder.

The busbars 65, 66 are vertical (or oblique, parallel to the edges 901, 903 of the part) rather than horizontal.

Figure 5:
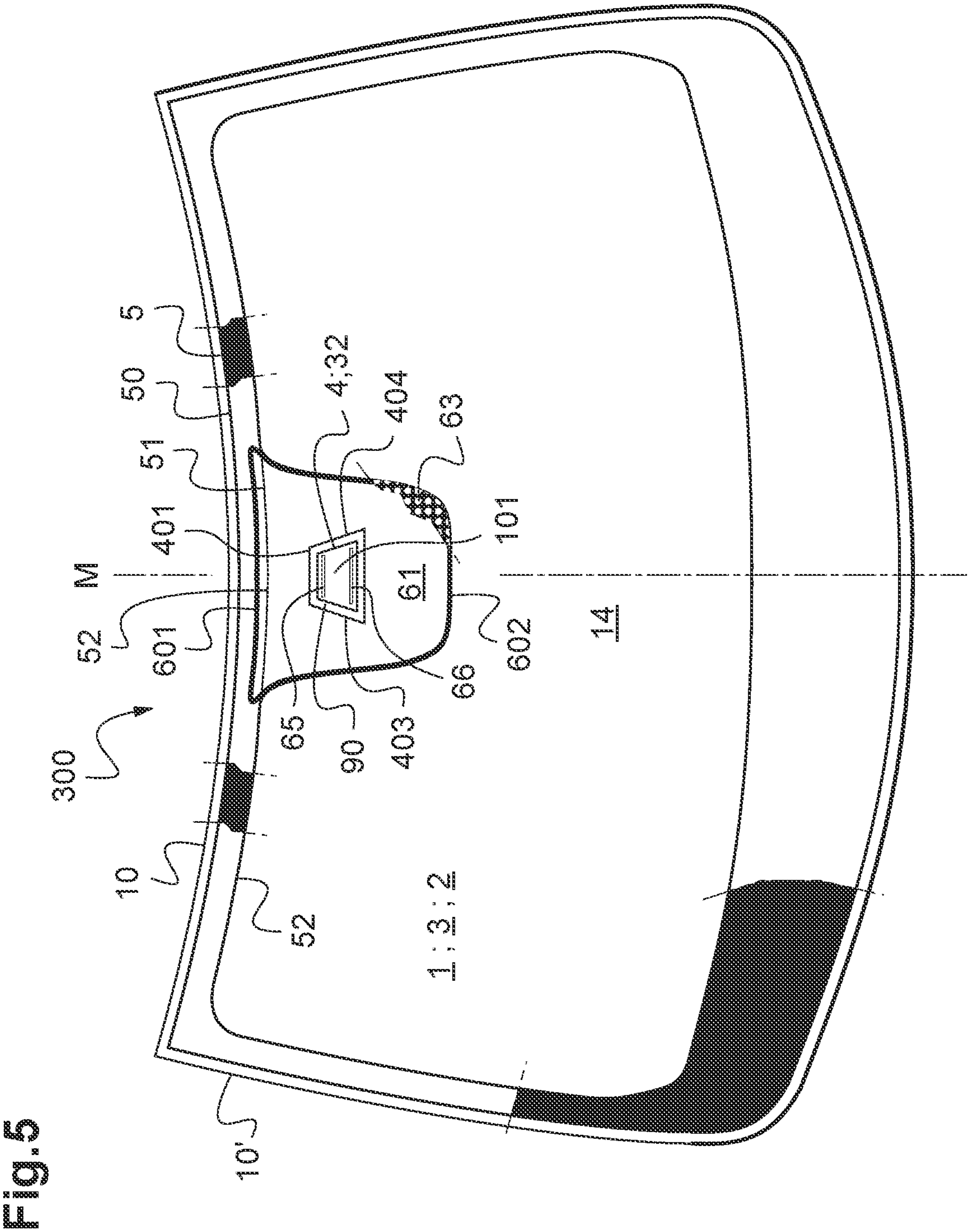
FIG. 5 shows a schematic front view (passenger compartment side) of this windshield 300.

FIG. 4 shows a schematic sectional view of a windshield 300 according to the invention with an infrared vision system such as a LIDAR in a third embodiment of the invention. FIG. 5 shows a schematic front view (passenger compartment side) of this windshield 300.

Only the differences with the first embodiment are explained hereunder.

The heating layer 64 with the horizontal busbars 65, 66 is placed on the connecting surface 92 of the piece 9. The heating layer is for example the same shape as the part, here trapezoidal. The horizontal longitudinal edges or large sides of the layer 64 are parallel to the large sides of the piece 9. The small sides are parallel to the small sides of the piece 9. Here the busbars are as peripheral as possible to offset them from the central infrared transmission zone.

Furthermore, potentially the opaque masking layer 5 is not widened in the central zone (passing through M). For example, there is an athermal layer 62 on face F2 12 covering substantially face F2 (excluding the infrared transmission zone and opaque masking layer). The electrically conductive athermal layer 62 (solar control, heating, etc.) lacks or is provided with a first trapezoidal gap (as a variant, rectangular, or any other shape) in line with the through-hole 4 (infrared transmission zone). There is no longer a camouflaging coating on face F2 in the infrared transmission zone.

A functional element 60 completes the masking (for the outside) and forms an enlarged central masking zone (sensor location zone, etc.) and is arranged inside the lamination interlayer, for example made of two PVB sheets. It has an upper edge 601 under the enamel zone 5 and a lower edge 602 toward the center of the windshield, for example facing the athermal layer 62.

The functional masking element 60 comprises a sheet or support for example of 100 μm, particularly made of polymer for example PET or UTG, transparent to the working wavelength of the LIDAR with a first main face on the side of face F2 61 and with a second main face on the side of face F3 62.

The first face 61 (alternatively the second main face 62) bears a camouflaging coating that is opaque in the visible range 63 and transparent to the working wavelength. This camouflaging coating is then also used to hide the LIDAR and the box 8.

As a variant, the first face 61 (alternatively the second main face 62) bears a coating that is opaque in the visible range and at the working wavelength, provided with a trapezoidal gap (as a variant, rectangular, or any other shape) in line with the through-hole 4.

The insert 60 can bear a sensor (antenna, etc.) of a light-emitting screen particularly on face 62 side F3. The opaque camouflaging coating 63, the opaque insert 60 can then comprise one or more resists for these sensors.

Alternatively, the opaque insert 60 is opaque in mass (without camouflaging coating) and may then comprise one or more resists or one or more transparent zones in mass.

FIG. **6*a* shows schematically in cross sectional view a windshield 400*a*** according to the invention with an infrared vision system such as a LIDAR in a fourth embodiment of the invention.

FIG. **6*b* shows schematically in cross sectional view a windshield 400*b*** according to the invention with an infrared vision system such as a LIDAR in a variant of the fourth embodiment of the invention.

As shown in FIGS. **6*a* and 6*b*, the through-hole 4 is a notch, for example trapezoidal (FIG. 6*a*) as well as the gap in the opaque layer 5 with its edges 502, 503, 504 or rectangular (FIG. 6*b*) as well as the gap in the opaque layer 5 with its top and bottom edges 502, side edges 503, 504**.

The through-hole is preferably on the roof side (on the upper longitudinal edge 10). The through-hole 4 here has rounded corners.

The opening through-hole 4 can be in another region of the windshield 100 or even in another glazed unit of the vehicle, in particular the rear window.

For example, the busbars 65, 66 on the piece are horizontal (FIG. **6*a*) or vertical (FIG. 6*b***).

FIG. 7 shows a schematic sectional view a of windshield 500 according to the invention with an infrared vision system such as a LIDAR in a fifth embodiment of the invention.

Only the differences with the first embodiment are explained hereunder.

In one embodiment, the PVB lamination interlayer has an interlayer through-hole with a shape that is homothetic to the through-hole 4, for example, trapezoidal or rectangular, for example, slightly wider, with top and bottom longitudinal walls 301, 302 below the through-hole.

The piece 9 is in adhesive contact with a connecting film 81 which may be made of identical or different material to the PVB and/or have an identical or different thickness to the perforated PVB. The connecting film 81 allows the piece 9 to be bonded to face F2 with the camouflaging coating 102.

After lamination, the connecting film 81 is not necessarily distinguishable from said PVB sheet (and forming a PVB continuity by creep, its edges being in contact with the edges 301 and 302).

The piece 9 is transparent. It has the heating coating 64 (with peripheral, for example, side, busbars) on the connecting surface 91 rather than on an additional support.

As a variant, the interlayer hole is partial and the connecting film can be removed.

FIG. 8 shows a schematic sectional view of a windshield 600 according to the invention, with an infrared vision system such as a LIDAR in a sixth embodiment of the invention.

Only the differences with the first embodiment are explained hereunder.

The second glass sheet 2 is made of extra-clear glass and has no through-hole in the infrared transmission zone.

Possibly an anti-reflective coating is on face F4 14 in this zone.

The solar control or low-emissivity, possibly heatable conductive layer 103, in particular a silver stack, is provided with a gap in the infrared transmission zone.

FIG. 9 shows a schematic sectional view of a windshield 700 according to the invention, with an infrared vision system such as a LIDAR in a seventh embodiment of the invention.

Only the differences with the last embodiment are explained hereunder.

The heating coating 64 is on face F3 and not on the thin support 60, which itself has a camouflaging coating 63 (as in the third embodiment).

The invention claimed is:

1. A vehicle glazed unit, comprising:

a first glass sheet forming an outer glazing with a first external main face oriented towards an exterior environment of a vehicle and a second internal main face oriented towards a passenger compartment of the vehicle, at least one first zone that forms an infrared transmission zone transparent to a working wavelength in the infrared in a range from 800 nm to 1800 nm, wherein, in said infrared transmission zone, the glazed unit comprises, opposite the first external main face, a heating coating comprising a heating layer made of an electrically conductive material which is transparent to said working wavelength and which is a transparent conductive oxide comprising an indium oxide and another metal chosen from molybdenum and titanium, wherein in the infrared transmission zone with the heating layer, the vehicle glazed unit has a total infrared transmission of at least 70% at the working wavelength, and wherein a thickness of the heating layer is at most 150 nm and the resistivity is at most 500 μohm.cm.

2. The vehicle glazed unit according to claim 1, wherein for the heating layer, a percentage by weight of indium oxide is at least 90% of a total weight of the transparent conductive oxide.

3. The vehicle glazed unit according to claim 1, wherein the heating coating comprises a stack of layers as follows: at least one underlayer of oxy and/or metal or silicon nitride underlying the heating layer, and/or at least one overlayer of oxy and/or metal or silicon nitride on the heating layer.

4. The vehicle glazed unit according to claim 1, wherein the heating layer has at least two busbars and hidden from the outside by:

a masking layer opaque in the visible spectrum and at the working wavelength, offset from the infrared transmission zone at least in a central region of the infrared transmission zone, and/or by a selective camouflage filter, opaque in the visible spectrum and transparent to the working wavelength present in the infrared transmission zone and optionally protruding from said infrared transmission zone.

5. The vehicle glazed unit according to claim 1, wherein the heating layer has at least two busbars offset from the infrared transmission zone and comprising, on the second internal main face side, a lamination interlayer and a second glass sheet which potentially is perforated in the infrared transmission zone, the at least two busbars are under the second glass sheet.

6. The vehicle glazed unit according to claim 1, wherein the heating layer extends to cover another transmission zone adjacent to said infrared transmission zone.

7. The vehicle glazed unit according to claim 1, wherein in the infrared transmission zone with the heating coating, the vehicle glazed unit comprises, on the second internal main face side a selective camouflage filter which absorbs in the visible spectrum and is transparent to the working wavelength, the vehicle glazed unit having a total transmission of at most 10.0% in the visible spectrum.

8. The vehicle glazed unit according to claim 7, wherein the selective camouflage filter is a camouflaging coating on second internal main face or, the glazed unit being laminated and comprising, on the second internal main face side, a lamination interlayer and a second glass sheet with a third main face oriented towards the second internal main face and a fourth internal main face oriented towards the passenger compartment, the camouflaging coating being a submillimeter film within the lamination interlayer, and wherein the heating coating is optionally distant from second internal main face.

9. The vehicle glazed unit according to claim 1, further comprising a functional layer or, the vehicle glazed unit is laminated and comprises on the second internal main face side a lamination interlayer and a second glass sheet with a third main face oriented towards the second internal main face and a fourth internal main face oriented towards the passenger compartment, the functional layer being on said third main face or said fourth internal main face of the second glass sheet, the functional layer extending over all or piece of the vehicle glazed unit, wherein the functional layer is a transparent electrically conductive layer, or else an opaque masking layer, the functional layer being absorbent to said working wavelength and which is absent from the infrared transmission zone at least in the central zone and is present at an edge of the infrared transmission zone and wherein optionally a functional coating is on the second internal main face, transparent to the working wavelength, facing the infrared transmission zone and in contact with said functional layer.

10. The vehicle glazed unit according to claim 1, wherein, in the infrared transmission zone with the heating coating, the glazed unit comprises, on the second internal main face side, an element which is anti-reflective to said working wavelength, the glazed unit with said anti-reflective element has a total transmission of at least 75% or 80% at the working wavelength.

11. The vehicle glazed unit according to claim 10, wherein the anti-reflective element to said working wavelength is an anti-reflective coating, or the glazed unit is laminated and comprises, on the second internal main face side, a lamination interlayer and a second glass sheet with a third main face oriented towards the second internal main face and a fourth internal main face oriented towards the passenger compartment, the anti-reflective coating is on a piece in a through-hole of the second glass sheet.

12. The vehicle glazed unit according to claim 1, wherein the vehicle glazed unit is laminated and comprises, on the second internal main face side, a lamination interlayer and a second glass sheet with a third main face oriented towards the second internal main face and a fourth internal main face oriented towards the passenger compartment, the second glass sheet with a through-hole in the infrared transmission zone, having a surface cross-section with a smallest dimension of at least 3 cm, and with a largest dimension of not more than 70 cm.

13. A device, comprising:

said vehicle glazed unit according to claim 1, and an infrared detection system at the working wavelength in the infrared, arranged in the passenger compartment and comprising a transmitter and/or receiver, so as to transmit and/or receive radiation passing through the first glass sheet at the infrared transmission zone.

14. The device according to claim 13, wherein the infrared detection system is a LIDAR or a near-infrared camera.

15. A vehicle glazed unit, comprising:

a first glass sheet forming an outer glazing with a first external main face oriented towards an exterior environment of a vehicle and a second internal main face oriented towards a passenger compartment of the vehicle, at least one first zone that forms an infrared transmission zone transparent to a working wavelength in the infrared in a range from 800 nm to 1800 nm, wherein, in said infrared transmission zone, the glazed unit comprises, opposite the first external main face, a heating coating comprising a heating layer made of an electrically conductive material which is transparent to said working wavelength and which is a transparent conductive oxide comprising an indium oxide and another metal chosen from molybdenum and titanium, wherein in the infrared transmission zone with the heating layer, the vehicle glazed unit has a total infrared transmission of at least 70% at the working wavelength, and wherein the heating layer is defined by a power density of at least 100 $W/m^2$ and of at most 2000 $W/m^2$.

16. A vehicle glazed unit, comprising:

a first glass sheet forming an outer glazing with a first external main face oriented towards an exterior environment of a vehicle and a second internal main face oriented towards a passenger compartment of the vehicle, at least one first zone that forms an infrared transmission zone transparent to a working wavelength in the infrared in a range from 800 nm to 1800 nm, wherein, in said infrared transmission zone, the glazed unit comprises, opposite the first external main face, a heating coating comprising a heating layer made of an electrically conductive material which is transparent to said working wavelength and which is a transparent conductive oxide comprising an indium oxide and another metal chosen from molybdenum and titanium, wherein in the infrared transmission zone with the heating layer, the vehicle glazed unit has a total infrared transmission of at least 70% at the working wavelength, wherein the heating coating is on a substrate:

wherein the substrate is the first glass sheet and the heating coating is on the second internal main face, the vehicle glazed unit being monolithic, or wherein the vehicle glazed unit is laminated and comprises on the second internal main face side, a lamination interlayer and a second glass sheet, wherein the substrate is the second glass sheet that is transparent to the working wavelength, the substrate is a film present within the lamination interlayer, which is transparent to the working wavelength, or the substrate is a piece transparent to the working wavelength, said piece being present in a through-hole of the second glass sheet in the infrared transmission zone, or the substrate is the first glass sheet, the lamination interlayer being perforated by an interlayer through-hole in line with a through-hole of the second glass sheet.

17. The vehicle glazed unit according to claim 16, wherein the film is made of glass, which is optionally extra-clear, or the piece is a glass, which is optionally extra-clear.

18. A vehicle glazed unit, comprising:

a first glass sheet forming an outer glazing with a first external main face oriented towards an exterior environment of a vehicle and a second internal main face oriented towards a passenger compartment of the vehicle, at least one first zone that forms an infrared transmission zone transparent to a working wavelength in the infrared in a range from 800 nm to 1800 nm, wherein, in said infrared transmission zone, the glazed unit comprises, opposite the first external main face, a heating coating comprising a heating layer made of an electrically conductive material which is transparent to said working wavelength and which is a transparent conductive oxide comprising an indium oxide and another metal chosen from molybdenum and titanium, wherein in the infrared transmission zone with the heating layer, the vehicle glazed unit has a total infrared transmission of at least 70% at the working wavelength, and wherein the vehicle glazed unit is laminated and comprises:

a lamination interlayer made of polymer material with a first main face oriented toward the second internal main face and with a second main face opposite the first main face of the lamination interlayer, a second glass sheet intended to form an interior glazing of the vehicle glazed unit with a third main face on the second internal main face side and a fourth internal main face oriented toward the passenger compartment.

19. The vehicle glazed unit according to claim 18, wherein the first glass sheet has a total iron oxide content by weight of at most 0.05% and the second glass sheet has a total iron oxide content by weight of at least 0.05%.

20. The vehicle glazed unit according to claim 18, wherein the first glass sheet has a total iron oxide content by weight of at most 0.05% and the second glass sheet has a total iron oxide content by weight of at least 0.4% and comprises a through-hole in a thickness of the second glass sheet, the through-hole being centimetric, a hole delimited by a wall, a closed or opening hole.

* * * * *